(12) United States Patent
Shimizu et al.

(10) Patent No.: US 10,120,439 B2
(45) Date of Patent: Nov. 6, 2018

(54) OPERATING DEVICE AND IMAGE PROCESSING APPARATUS

(71) Applicant: Konica Minolta, Inc., Chiyoda-ku (JP)

(72) Inventors: Hideaki Shimizu, Hino (JP); Yasuaki Sugimoto, Hachioji (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 236 days.

(21) Appl. No.: 14/446,561

(22) Filed: Jul. 30, 2014

(65) Prior Publication Data

US 2015/0035747 A1    Feb. 5, 2015

(30) Foreign Application Priority Data

Jul. 30, 2013  (JP) ................................ 2013-158315
Jul. 30, 2013  (JP) ................................ 2013-158316

(51) Int. Cl.
   *G06F 3/041*    (2006.01)
   *G06F 3/01*     (2006.01)
   (Continued)

(52) U.S. Cl.
   CPC ............ *G06F 3/013* (2013.01); *G06F 3/0484* (2013.01); *H04N 1/00278* (2013.01); *H04N 1/00381* (2013.01); *H04N 1/00395* (2013.01)

(58) Field of Classification Search
   CPC .... G06F 3/013; G06F 3/04842; G06F 3/0481; G06K 9/00604
   (Continued)

(56) References Cited

U.S. PATENT DOCUMENTS

| 2009/0231145 | A1* | 9/2009 | Wada ................. A61B 5/02416 340/575 |
| 2012/0105486 | A1* | 5/2012 | Lankford ............... G06F 3/013 345/661 |

(Continued)

FOREIGN PATENT DOCUMENTS

| EP | 2 613 226 | 7/2013 |
| JP | 3-137685 A | 6/1991 |

(Continued)

OTHER PUBLICATIONS

Office Action (Decision of Refusal) dated Jan. 5, 2016, by the Japanese Patent Office in corresponding Japanese Patent Application No. 2013-158315, and an English Translation. (9 pages).

(Continued)

*Primary Examiner* — Calvin C Ma
(74) *Attorney, Agent, or Firm* — Buchanan Ingersoll & Rooney PC

(57) ABSTRACT

Disclosed is an operating device including: an operating unit having a plurality of operation buttons; a gaze detection unit configured to detect a gaze of an operator who operates the operating unit; and a judgment unit configured to judge whether an operation for a predetermined operation button of the operating unit is valid or invalid when the operation is received from the operator, wherein in case that the gaze of the operator is not within a predetermined area relating to the predetermined operation button when the operation for the predetermined operation button is received from the operator, the judgment unit judges that the operation is invalid.

19 Claims, 31 Drawing Sheets

(51) Int. Cl.
*H04N 1/00* (2006.01)
*G06F 3/0484* (2013.01)

(58) Field of Classification Search
USPC .............................. 345/661; 348/78
See application file for complete search history.

(56) References Cited

U.S. PATENT DOCUMENTS

| | | | | |
|---|---|---|---|---|
| 2012/0295708 | A1* | 11/2012 | Hernandez-Abrego | ................... A63F 13/424 463/36 |
| 2013/0027302 | A1* | 1/2013 | Iwaizumi | .............. G06F 1/1686 345/158 |
| 2013/0169560 | A1* | 7/2013 | Cederlund | .............. G06F 3/013 345/173 |

FOREIGN PATENT DOCUMENTS

| JP | 08-147004 A | 6/1996 |
|---|---|---|
| JP | 9-297609 A | 11/1997 |
| JP | 10-333737 A | 12/1998 |
| JP | 2001-150735 A | 6/2001 |
| JP | 2007-045169 A | 2/2007 |
| JP | 2007-058507 A | 3/2007 |
| JP | 2009-015592 A | 1/2009 |
| JP | 2009-227246 A | 10/2009 |
| JP | 2010-267071 A | 11/2010 |
| JP | 2012-142878 A | 7/2012 |
| JP | 2012-203671 A | 10/2012 |
| JP | 2013-012060 A | 1/2013 |

OTHER PUBLICATIONS

Extended European Search Report issued in corresponding European Patent Application No. 14179017.0-1972, dated Dec. 23, 2014.
Notice of Reason for Refusal dated Sep. 8, 2016, by the Japanese Patent Office in corresponding Japanese Patent Application No. 2013-158315, and an English Translation of the Notice. (9 pages).
Office Action (Notice of Reason for Refusal) dated May 7, 2015, by the Japanese Patent Office in corresponding Japanese Patent Application No. 2013-158315, with an English translation of the Office Action. (12 pages).
Office Action (Notice of Reason for Refusal) dated Jun. 9, 2015, by the Japanese Patent Office in corresponding Japanese Patent Application No. 2013-158316, with an English translation of the Office Action. (9 pages).
Office Action dated Jan. 4, 2017, by The State Intellectual Property Office of People's Republic of China in corresponding Chinese Patent Application No. 201410359689.7 with an English translation of the Office Action (19 pages).
Communication pursuant to Article 94(3) EPC dated May 25, 2018, by the European Patent Office in corresponding European Patent Application No. 14 179 017.0. (7 pages).

* cited by examiner

| OPERATION BUTTON | GAZE | |
|---|---|---|
| | YES | NO |
| START BUTTON | VALID | INVALID |
| STOP BUTTON | VALID | INVALID |
| KEY (1) | VALID | VALID |
| KEY (2) | VALID | VALID |
| ... | ... | |

FIG.11

| OPERATION BUTTON | GAZE | | | |
|---|---|---|---|---|
| | DESTINATION OPERATION WINDOW | | DESTINATION ENTRY WINDOW | |
| | YES | NO | YES | NO |
| KEY (1) | VALID | INVALID | VALID | VALID |
| KEY (2) | VALID | INVALID | VALID | VALID |
| KEY (3) | VALID | INVALID | VALID | VALID |
| ... | ... | ... | ... | ... |

| OPERATION BUTTON | GAZE (FOR EACH MODE) | | | | | | | |
|---|---|---|---|---|---|---|---|---|
| | COPY | | SCAN | | FAX | | BOX | |
| | YES | NO | YES | NO | YES | NO | YES | NO |
| START BUTTON | VALID | VALID | VALID | INVALID | VALID | INVALID | VALID | VALID |

| AREA NAME | AREA DEFINITION | AREA TYPE |
|---|---|---|
| R_START | (34,9)-(39,11) | RECTANGLE |
| R_DISPLAY | (3,3)-(24,15) | RECTANGLE |
| R_TENKEY | (26,4)-(32,14) | RECTANGLE |
| R_STOP | (35,13)-(38,14) | RECTANGLE |
| R_ANY | - | ANY PORTION |

FIG.23

| OPERATION BUTTON | RELATED EFFECTIVE AREA |
|---|---|
| START BUTTON | R_START |
| KEY (1) | R_ANY |
| KEY (2) | R_ANY |
| ... | ... |
| STOP BUTTON | R_STOP |

FIG.25

| OPERATION BUTTON | RELATED EFFECTIVE AREA |
|---|---|
| KEY (1) | R_TENKEY,R_DISPLAY |

FIG.27

| OPERATION BUTTON | RELATED AREA DEFINITION | |
|---|---|---|
| | DESTINATION OPERATION WINDOW | DESTINATION ENTRY WINDOW |
| KEY (1) | R_TENKEY | R_ANY |
| KEY (2) | R_TENKEY | R_ANY |
| ... | ... | ... |

117

| OPERATION BUTTON | RELATED AREA DEFINITION | | | |
|---|---|---|---|---|
| | COPY | SCAN | FAX | BOX |
| START BUTTON | R_ANY | R_START | R_START | R_ANY | to set the destination or to input various settings, even though a wrong input button of a character or a number is pressed, a user is aware of the wrong operation by viewing the displayed input contents. Therefore, it is possible to correct the input contents by inputting characters again. In this case, even though the key operation is wrongly carried out, the situation caused by the wrong operation can be repaired.

On the other hand, in case of a job execution starting operation, a reset operation, a delete operation for deleting data from a memory, and the like, the error input has a significant influence and the situation caused by the error input cannot be repaired. For example, in case that a user who is accustomed to using a device operates the device without viewing the operation buttons, when a transmission button is wrongly pressed, the transmission process is advertently started. Then, even though a user is aware of the starting of the transmission process by viewing the indication of the finish of the transmission, the situation caused by the wrong operation cannot be repaired.

As disclosed in Japanese Patent Application Publication No. 2012-142878 and Japanese Patent Application Publication No. 2007-45169, in the technology for judging the validity of the key operation according to whether a user gazes at the display window, the device does not discriminate the operation button in which the bad situation can be repaired even though the wrong operation is carried out, from the operation button in which the bad situation cannot be repaired in case that the wrong operation is carried out. Therefore, even in case that the operation button in which the bad situation can be repaired even though the wrong operation is carried out, is pressed, a user has to operate the above operation button while the user views the display window. It is inconvenient for the user who is accustomed to operating a device because the user cannot slightly look away.

The technology disclosed in Japanese Patent Application Publication No. 2010-267071, is the technology for automatically judging the position of the user's intended gaze even though the user's gaze is slightly shifted. This technology does not contribute to the solution of the above problem.

SUMMARY

To achieve at least one of the abovementioned objects, an operating device reflecting one aspect of the present invention comprises:

an operating unit comprising a plurality of operation buttons;

a gaze detection unit configured to detect a gaze of an operator who operates the operating unit; and a judgment unit configured to judge whether an operation for a predetermined operation button of the operating unit is valid or invalid when the operation is received from the operator, wherein in case that the gaze of the operator is not within a predetermined area relating to the predetermined operation button when the operation for the predetermined operation button is received from the operator, the judgment unit judges that the operation is invalid.

Preferably, a plurality of operation buttons include a first type of operation button and a second type of operation button, and wherein in case that the predetermined operation button for which the operation is received from the operator is the first type of operation button, the judgment unit judges that the operation is invalid in case that the gaze of the operator is not within the predetermined area relating to the predetermined operation button when the operation for the predetermined operation button is received, and wherein in case that the predetermined operation button for which the operation is received from the operator is the second type of operation button, the judgment unit does not include a judgment as to whether the gaze of the operator is within the predetermined area relating to the predetermined operation button when the operation for the predetermined operation button is received, in a condition for judging whether the operation for the predetermined operation button is valid or invalid.

Preferably, the first type of operation button is an operation button for receiving any one instruction among an operation for starting a process, an operation for confirming input contents, an operation for stopping the process and an operation for resetting an input value, and the second type of operation button is an operation button for receiving an instruction except the operation for starting the process, the operation for confirming the input contents, the operation for stopping the process and the operation for resetting the input value.

Preferably, the operating device further comprises a setting changing unit configured to change a setting of each operation button of the operating unit so as to set each operation button to the first type of operation button or the second type of operation button.

Preferably, the operating device has a function of receiving a plurality of types of jobs by receiving an operation for setting and inputting any one of the plurality of types of jobs, and wherein the setting changing unit changes the setting of each operation button so as to set each operation button to the first type of operation button or the second type of operation button according to the type of job which is received by the operating unit.

Preferably, the operating device further comprises a display unit configured to display any one of a plurality of types of windows, wherein the setting changing unit changes the setting of each operation button so as to set each operation button to the first type of operation button or the second type of operation button according to the window displayed on the display unit.

Preferably, in case that the gaze of the operator is within an area in which the predetermined operation button which is operated is provided or within a center portion of the predetermined operation button which is operated, it is judged that the gaze of the operator is within the predetermined area relating to the predetermined operation button.

Preferably, the operating device further comprises an effective area management unit configured to store an effective area for judging the gaze of the operator, as the predetermined area relating to the predetermined operation button, for each operation button, wherein in case that the gaze of the operator is not within the effective area for one operation button of the operating unit when the operation for the one operation button is received, the judgment unit judges that the operation for the one operation button is invalid.

Preferably, the plurality of operation buttons include a first operation button and a second operation button, wherein a ratio of a size of the first operation button to a size of the effective area set for the first operation button is different from a ratio of a size of the second operation button to a size of the effective area set for the second operation button.

Preferably, the effective area can be changed for each operation button.

Preferably, has a function of receiving a plurality of types of jobs by receiving an operation for setting and inputting any one of the plurality of types of jobs, the effective area is set for each operation button and for each type of jobs, and when an operation for setting and inputting of one type of job is received by using the one operation button, the judgment unit judges whether the operation for the one operation button is valid or invalid in accordance with the effective area set for a combination of the one operation button and the one type of job.

Preferably, the operating device further comprises a display unit configured to display any one of a plurality of types of windows, wherein the effective area is set for each operation button and for each window, and when an operation for the one operation button is received, the judgment unit judges whether the operation for the one operation button is valid or invalid in accordance with the effective area set for a combination of the one operation button and the window displayed on the display unit.

Preferably, the plurality of operation buttons include a first operation button and a second operation button, wherein a whole area in which the first operation button is provided or only a part of the whole area is set as the effective area for the first operation button, and the effective area for the second operation button includes the second operation button and is set so as to be wider than an area in which the second operation button is provided.

Preferably, a common effective area including an area in which two or more operation buttons of the operating unit are provided is set for the two or more operation buttons.

Preferably, a plurality of the effective areas can be set for the one operation button.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIG. 8 is a view showing an example of the management table according to the first embodiment;

FIG. 11 is a view showing an example of the management table (for each operation button and for each window) according to the first embodiment;

FIG. 12 is a view showing an example of the management table (for each operation button and for each function mode) according to the first embodiment;

FIG. 22 is a view showing the list of a plurality of defined effective areas;

FIG. 23 is a view showing an example of the management table in which the effective area information is registered for each operation button;

FIG. 25 is a view showing the management table in which a plurality of effective areas are set for one operation button;

FIG. 27 is a view showing an example of the management table (for each operation button and for each window) according to the second embodiment;

DETAILED DESCRIPTION OF PREFERRED EMBODIMENTS

Hereinafter, preferred embodiments of the present invention will be explained with reference to the accompanying drawings.

First Embodiment

Figure 1:
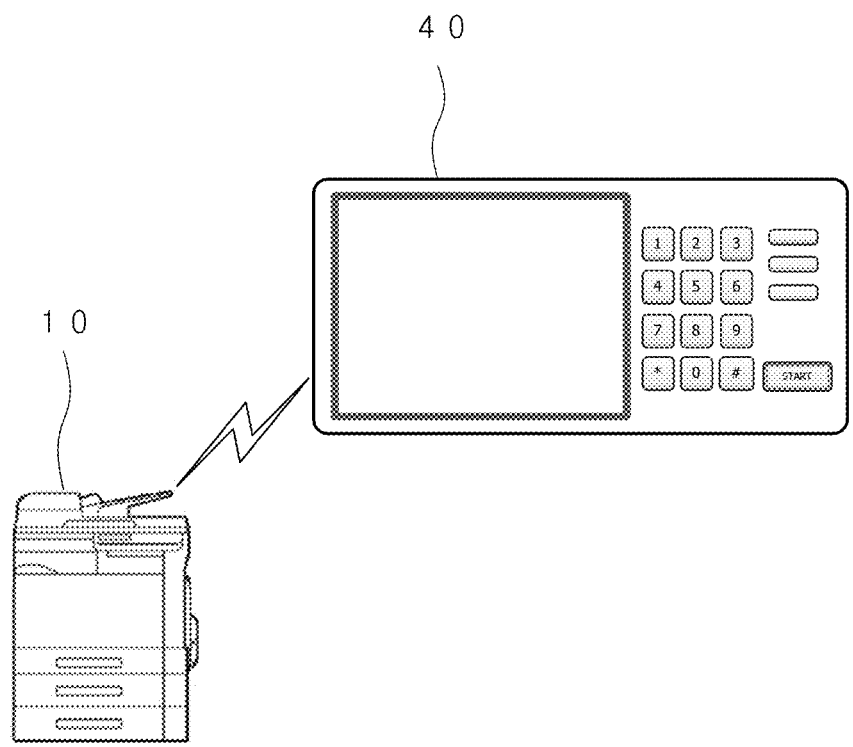
FIG. 1 is a view showing the image processing apparatus according to the first embodiment and the operation display device for remotely controlling the image processing apparatus.

FIG. 1 shows the image processing apparatus 10 according to the first embodiment and the operation display device 40 for remotely controlling the image processing apparatus 10. The operation display device 40 is connected with the image processing apparatus 10 via a network, such as a LAN (Local Area Network) or the like, so as to be communicable with each other. The image processing apparatus 10 may be connected with the operation display device 40 via a wireless communication or a cable communication. However, a wireless communication is preferable to a cable communication.

The image processing apparatus 10 is a so-called multifunction peripheral (MFP) having the copy function for printing an image on recording paper by optically reading an original, the scan function for obtaining image data by reading an original to store the image data as a file or to transmit the image data to an external terminal via a network, the printer function for printing out an image by forming the image on the recording paper in accordance with the print data received from a PC or the like via the network, the facsimile function for transmitting and receiving the image data in accordance with the facsimile protocol, and the like.

Each of the image processing apparatus 10 and the operation display device 40 according to the first embodiment has a function for detecting the gaze of the operator. Further, each of the image processing apparatus 10 and the operation display device 40 has a function for invalidating the operation carried out for the first type of operation button (referred to as gaze necessity button) in case that the operator's gaze is not directed to the gaze necessity button when the gaze necessity button is operated. When the second type of operation button (hereinafter, referred to as gaze non-necessity button) is operated, each of the image processing apparatus 10 and the operation display device 40 does not judge the validity/invalidity of the operation carried out for the gaze non-necessity button, according to whether the operator's gaze is directed to the gaze non-necessity button.

In this embodiment, in case that the operator's gaze is directed to a first type of operation button when the first type of operation button is operated, the operation carried out for this operation button is validated, and in case that the operator's gaze is not directed to the first type of operation button when the first type of operation button is operated, the operation carried out for this operation button is invalidated. On the other hand, whether the operator's gaze is directed to the second type of operation button or not when the second type of operation button is operated, the operation carried out for this operation button is validated.

Figure 2:
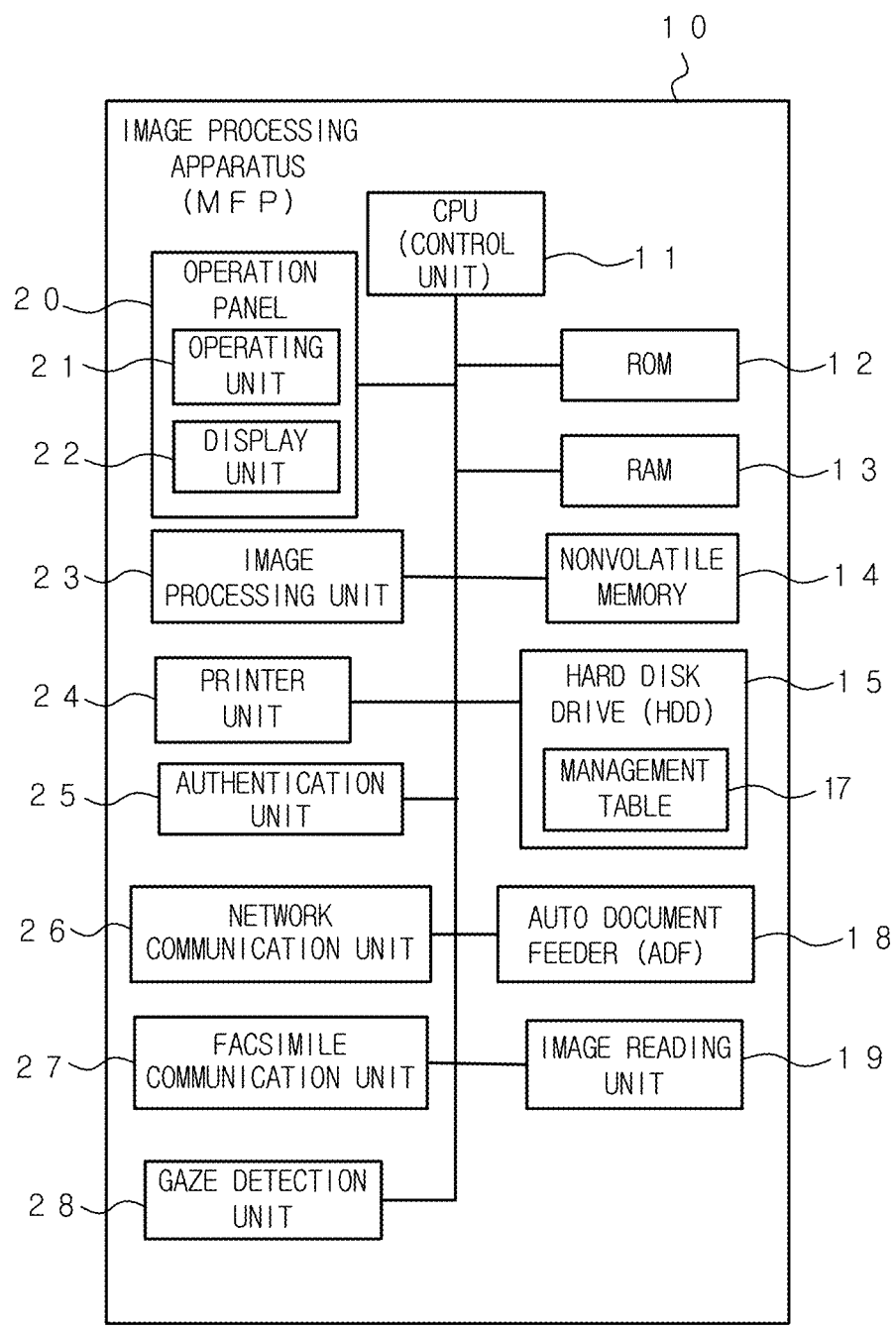
FIG. 2 is a block diagram showing a schematic configuration of the image processing apparatus according to the first embodiment.

FIG. 2 shows the block diagram showing the schematic configuration of the image processing apparatus 10. The image processing apparatus 10 comprises a CPU (Central Processing Unit) 11 as a control unit for entirely controlling the operation of the image processing apparatus 10. The CPU 11 is connected with a ROM (Read Only Memory) 12, a RAM (Random Access Memory) 13, a nonvolatile memory 14, a hard disk drive 15, an auto document feeder (ADF) 18, an image reading unit 19, an operation panel 20 (an operating unit 21 and a display unit 22), an image processing unit 23, a printer unit 24, an authentication unit 25, a network communication unit 26, a facsimile communication unit 27, a gaze detection unit 28 and the like, via a bus.

By the CPU 11, a middleware, application programs and the like are executed on an OS (Operating System) program as a base. In the ROM 12, various types of programs are stored. By executing various types of processes by the CPU 11 in accordance with these programs, each function of the image processing apparatus 10 is realized.

The RAM 13 is used as a work memory for temporarily storing various types of data when the CPU 11 executes the process in accordance with the programs, and as an image memory for storing image data, and the like.

The nonvolatile memory 14 is a memory (flash memory) in which the stored contents are not damaged even if the image processing apparatus 10 is turned off, and is used for storing various setting information, and the like.

The hard disk drive 15 is a large-capacity nonvolatile storing device. In the hard disk drive 15, various types of programs and data are stored in addition to print data, data relating to windows to be displayed. In the hard disk drive 15, a management table 17 for registering the validity/invalidity information indicating whether each operation button is set to the gaze necessity button or the gaze non-necessity button, is stored.

The image reading unit 19 has a function for optionally reading an original to obtain the image data. For example, the image reading unit 19 comprises a light source for irradiating an original with light, a line image sensor for reading the original line by line in the width direction of the original by receiving the reflected light from the original, a moving unit for sequentially moving the reading position line by line in the longitudinal direction of the original, an optical system having lenses, mirrors and the like for guiding the reflected light from the original to the line image sensor and focusing the reflected light on the line image sensor, a converting unit for converting an analog image signal outputted from the line image sensor into digital image data, and the like.

The auto document feeder 18 has a function for conveying the original by feeding the original set to the original setting tray from the top sheet one by one, to pass the original through the reading position of the image reading unit 19 and to discharge the original to a predetermined discharge position. The image reading unit 19 has a function for reading the original disposed on the platen glass and a function for sequentially reading the original conveyed by the auto document feeder 18.

The operation panel 20 comprises an operating unit 21 and a display unit 22, and has a function for displaying various types of operation windows, setting windows and the like, and a function for receiving various types of operations, such as input of a job, from a user. The display unit 22 comprises a liquid crystal display (LCD) and a driver thereof. The operating unit 21 comprises various types of hardware switches, such as a start button, and a touch panel provided on the display screen of the display unit 22. The touch panel detects the coordinate position on which the display screen of the display unit 22 is contacted by a touch pen, the user's finger or the like to operate the image processing apparatus 10. The operating unit 21 receives the flick operation, the drag operation or the like via the touch panel.

The image processing unit 23 carries out the rasterization processing for converting print data into image data, the compression/decompression processing for image data and the like, in addition to the processings, such as enlargement/reduction and rotation of the image.

The printer unit 24 has a function for forming an image on the recording paper in accordance with the image data. In this embodiment, the printer unit 24 is configured as a so-called laser printer which comprises a conveying device for the recording paper, a photoconductive drum, a charging device, a laser unit, a developing device, a transfer and separation device, a cleaning device and a fixing device, and which forms an image by the electrophotographic process. Alternatively, an image may be formed by another type of printer.

The authentication unit 25 authenticates a user who uses the image processing apparatus 10. The authenticating method may be an optional method, and in the method, a password, a fingerprint, a vein or the like may be used.

The network communication unit 26 has a function for communicating with the operation display device 40, an external PC, a server or the like. The network communication unit 26 can carry out both the wireless communication and the cable communication. Alternatively, the network communication unit 26 may carry out only one of the wireless communication and the cable communication.

The facsimile communication unit 27 has a function for transmitting and receiving the image data to/from an external device having the facsimile function via a telephone line.

The gaze detection unit 28 detects the gaze of the operator (user) who views the operation panel 20 of the image processing apparatus 10. The gaze detecting method may be an optional method. For example, a camera is provided at the middle portion of the upper edge of the operation panel 20, and the image obtained by the camera is analyzed to detect the operator's gaze from the direction of the operator's face, the position of the pupil in the operator's eye, and the like. The image processing apparatus 10 can recognize the portion of the operation panel 20, which the operator views, by detecting the operator's gaze with the gaze detection unit 28.

Figure 3:
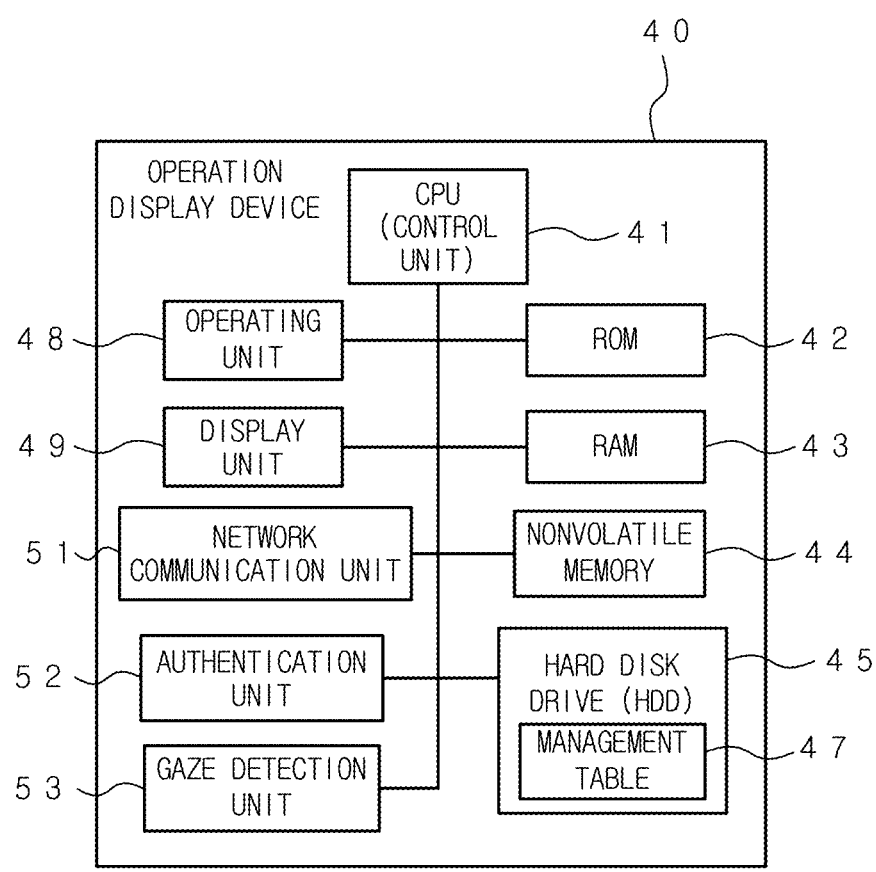
FIG. 3 is a block diagram showing a schematic configuration of the operation display device according to the first embodiment.

FIG. 3 is a block diagram showing the schematic configuration of the operation display device 40. The operation display device 40 comprises a CPU 41 for entirely controlling the operation of the operation display device 40. The CPU 41 is connected with a ROM 42, a RAM 43, a nonvolatile memory 44, a hard disk drive 45, an operating unit 48, a display unit 49, a network communication unit 51, an authentication unit 52, a gaze detection unit 53 and the like, via a bus.

By the CPU 41, a middleware, application programs and the like are executed on an OS (Operating System) program as a base. In the ROM 42, various types of programs are stored. By executing various types of processes by the CPU 41 in accordance with these programs, each function of the operation display device 40 is realized.

The RAM 43 is used as a work memory for temporarily storing various types of data when the CPU 41 executes the process in accordance with the programs, and for storing the data for displaying the contents.

The nonvolatile memory 44 is a memory (flash memory) in which the stored contents are not damaged even if the operation display device 40 is turned off, and is used for storing various setting information, and the like.

The hard disk drive 45 is a large-capacity nonvolatile storing device. In the hard disk drive 45, various types of programs and data are stored in addition to data relating to windows to be displayed. In the hard disk drive 45, a management table 47 which is the same as the management table 17 of the image processing apparatus 10, is prepared and stored.

The display unit 49 has a function for displaying various types of operation windows, setting windows, and the like. The display unit 49 comprises a liquid crystal display and a driver thereof. The operating unit 48 has a function for receiving various types of operations, such as input of a job, from an operator. The operating unit 48 comprises various types of hardware switches, such as a start button, and a touch panel provided on the display screen of the display unit 49. The touch panel detects the coordinate position on which the display screen of the display unit 49 is contacted by a touch pen, the operator's finger or the like to operate the operation display device 40. The operating unit 48 receives the flick operation, the drag operation or the like via the touch panel.

The network communication unit 51 has a function for communicating with the image processing apparatus 10, an external PC, a server or the like. The network communication unit 51 can carry out both the wireless communication and the cable communication. Alternatively, the network communication unit 51 may carry out only one of the wireless communication and the cable communication.

The authentication unit 52 authenticates the operator who uses the operation display device 40. The operator is authenticated by using an ID (Identification) card or a fingerprint, or by checking a user ID (Identification) with a password, or the like.

The gaze detection unit 53 detects the gaze of the operator who operates the operation display device 40. Like the gaze detection unit 28, the gaze detecting method may be an optional method. The operation display device 40 can recognize the portion of the operation display device 40 (the portion of the display unit 49, or the buttons), which the operator views, by detecting the operator's gaze with the gaze detection unit 53.

Next, the operation for receiving the operations on the operation panel 20 of the image processing apparatus 10 from the operator, will be explained. The image processing apparatus 10 and the operation display device 40 carry out the same operation for receiving the operations from the operator. Therefore, in this embodiment, the operation of the image processing apparatus 10 will be explained and the explanation of the operation of the operation display device 40 is omitted.

Figure 4:
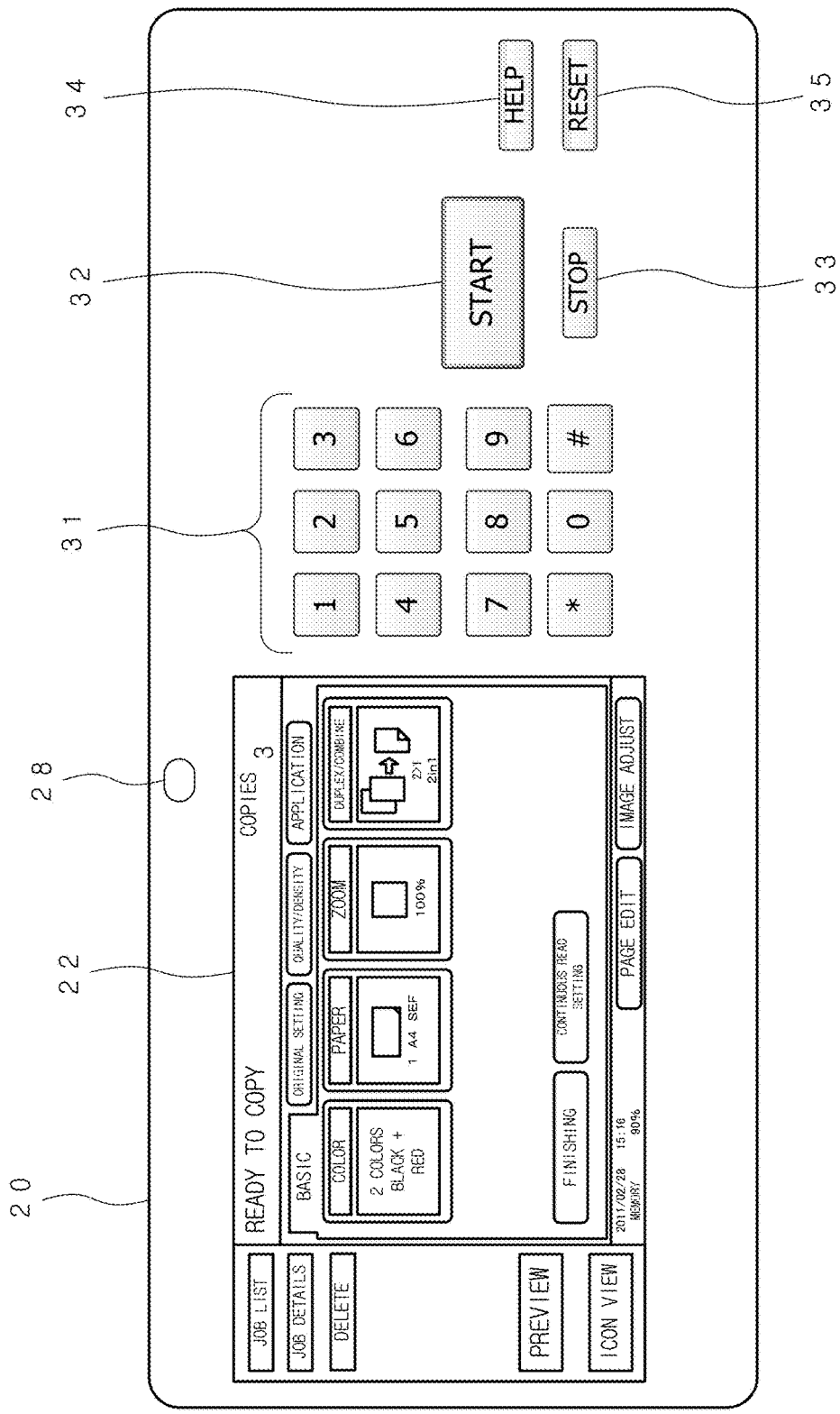
FIG. 4 is a plan view showing the operation panel according to the first embodiment.

FIG. 4 is a plan view showing the appearance of the operation panel 20 of the image processing apparatus 10. Because the plan view of the operation display device 40 is the same as that of the operation panel 20, the explanation of the operation display device 40 is omitted. In the left part of the operation panel 20, the display unit 22 is provided. In the right part of the operation panel 20, various types of hardware keys are provided. Specifically, the numerical keypad (ten-key) 31 having the input buttons for inputting the numbers from 0 to 9, and the input buttons "*" and "#", the start button 32, the stop button 33, the help button 34, the reset button 35, and the like are provided as the hardware keys. In the upper middle portion of the operation panel 20, the lens of the camera provided in the gaze detection unit 28 (a hole for the incident light) is arranged.

Figure 5:
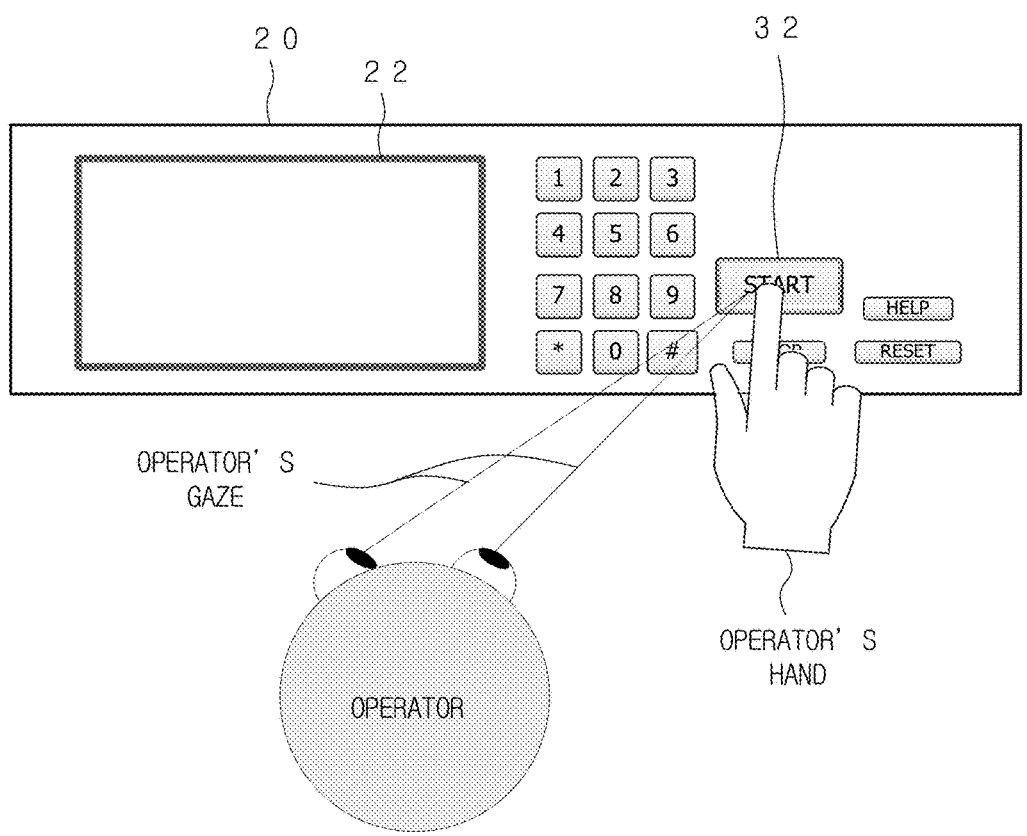
FIG. 5 is a view showing the situation in which an operator operates the start button while the operator views the start button in the first embodiment.

FIG. 5 shows the situation in which the operator operates the start button 32 while the operator views the start button 32. The start button 32 is an important operation button for instructing the start of the job execution. A wrong operation for the start button 32 is a significant error which causes the irreparable situation. Therefore, the start button 32 is set to the gaze necessity button. The image processing apparatus 10 judges that the operation for the start button 32 is valid and accepts the above operation in case that the operator views the start button 32 (the operator's gaze is directed to the start button 32) when the operation for the start button 32 is received from the operator.

Figure 6:
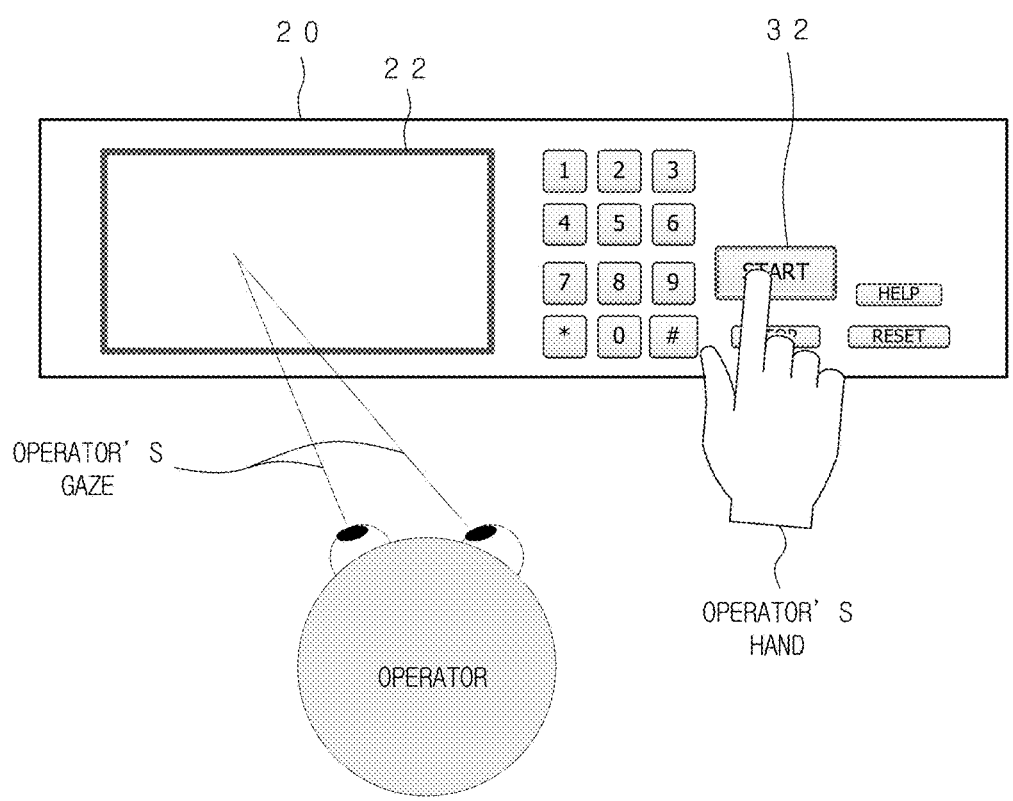
FIG. 6 is a view showing the situation in which an operator operates the start button without viewing the start button in the first embodiment.

On the other hand, as shown in FIG. 6, in case that the operator does not view the start button 32 (the operator's gaze is not directed to the start button 32) when the operation for the start button 32 is received from the operator, the image processing apparatus 10 judges that the operation for the start button 32 is invalid and does not accept the above operation.

In the example of FIG. 6, because the operator operates the start button 32 without viewing the start button 32 while the operator views the display unit 22, the above operation is invalidated.

The numerical keypad 31 is used when the telephone number of the transmission destination is input or the password is input. For example, in case of a wrong operation carried out for the numerical keypad 31 when the telephone number is input, the input contents can be modified. Because the wrong operation for the numerical keypad 31 is a slight error which can be repaired, the numerical keypad 31 is set to the gaze non-necessity button. The image processing apparatus 10 judges that the operation for the numerical keypad 31 is valid and accepts the above operation regardless of whether the operator views the numerical keypad 31 when the operation for the numerical keypad 31 is received from the operator, that is, even though the operator does not gaze at the numerical keypad 31 to be operated.

Figure 7:
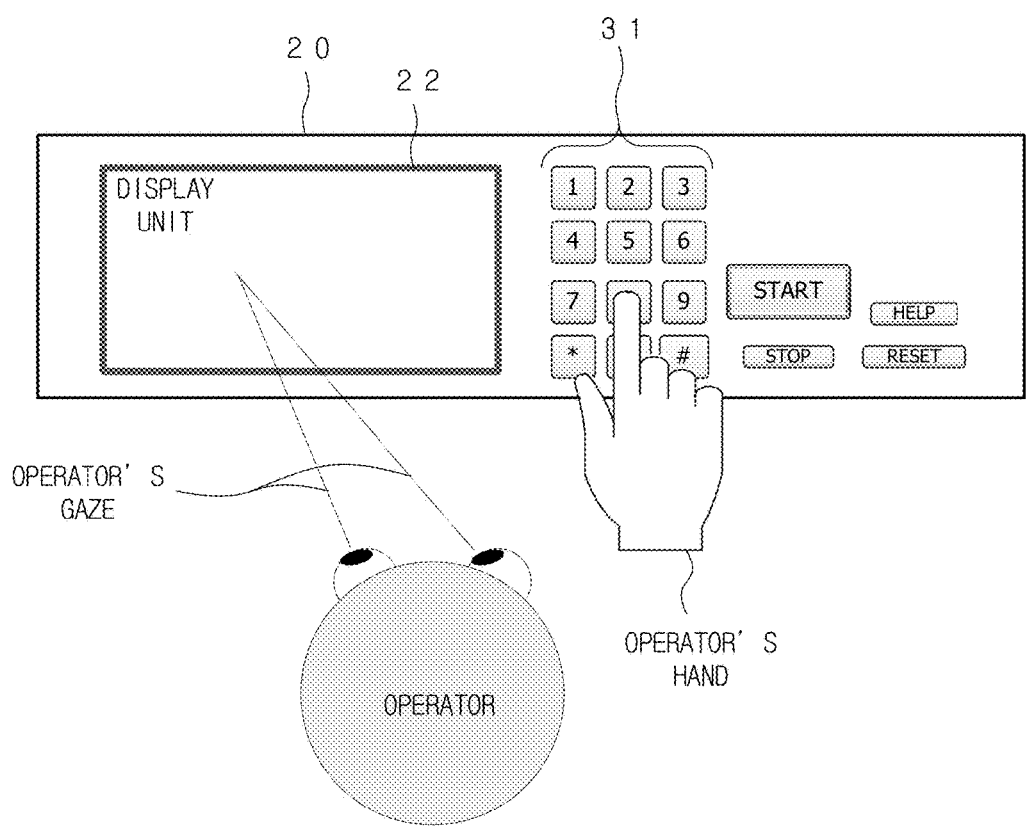
FIG. 7 is a view showing the situation in which an operator operates the numerical keypad without viewing the numerical keypad.

For example, as shown in FIG. 7, even though the operator operates the numerical keypad 31 while the operator views the display unit 22, the image processing apparatus 10 judges that the operation for the numerical keypad 31 is valid and accepts the above operation.

FIG. 8 shows an example of the management table 17. In the management table 17, the validity/invalidity information indicating whether each operation button is set to the gaze necessity button or the gaze non-necessity button, is registered. In detail, the name of the operation button, the validity/invalidity information which is applied when the operator's gaze is directed to the corresponding operation button (in this table, the information which is registered in the item "Yes") and the validity/invalidity information which is applied when the operator's gaze is not directed to the corresponding operation button (in this table, the information which is registered in the item "No", are registered for each operation button.

The validity/invalidity information which is applied when the operator's gaze is directed to the operation button is information indicating whether the operation for the operation button is validated or invalidated in case that the operator's gaze is directed to the above operation button when the above operation button is operated. The validity/invalidity information which is applied when the operator's gaze is not directed to the operation button is information indicating whether the operation for the operation button is validated or invalidated in case that the operator's gaze is not directed to the above operation button when the above operation button is operated.

In the management table 17 of FIG. 8, the operation button in which the item "Yes" is set to "validity" and the item "No" is set to "invalidity", is the gaze necessity button. In the management table 17 of FIG. 8, the operation button in which the item "Yes" is set to "validity" and the item "No" is set to "validity", is the gaze non-necessity button.

According to the management table 17 shown in FIG. 8, the start button 32 is set to the gaze necessity button. The operation for the start button 32 is validated in case that the operator's gaze is directed to the start button 32 when the start button 32 is operated. The operation for the start button 32 is invalidated in case that the operator's gaze is not directed to the start button 32 when the start button 32 is operated. The stop button 33 is also set to the gaze necessity button. The operation for the stop button 33 is validated in case that the operator's gaze is directed to the stop button 33 when the stop button 33 is operated. The operation for the stop button 33 is invalidated in case that the operator's gaze is not directed to the stop button 33 when the stop button 33 is operated.

The key (1) of the numerical keypad 31 (the input button for inputting the number "1") is set to the gaze non-necessity button. The operation for the key (1) is validated in case that the operator's gaze is directed to the key (1) when the key (1) is operated. The operation for the key (1) is validated also in case that the operator's gaze is not directed to the key (1) when the key (1) is operated. The operation for the key (2) is also the same as the operation for the key (1).

The setting of the management table 17 shown in FIG. 8 and in FIGS. 11 and 12 which will be explained below, can be optionally changed by the user (for example, an administrator or the like). That is, by changing the registered contents of the management table 17, it is possible to optionally change each operation button to the gaze necessity button or the gaze non-necessity button.

Specific Example

The case in which the image processing apparatus 10 executes the Scan To Email transmission job, is explained. The Scan To Email transmission job is a job for obtaining an image data as a file by optically reading an original with the image reading unit 19 and for transmitting an electronic mail (Email) attaching the file to the designated destination.

The job is executed as follows. A user sets an original to the image reading unit 19, selects the destination from the destination list displayed on the display unit 22 of the operation panel 20 and presses the start button 32. Normally, the image processing apparatus 10 starts the transmission immediately after the start button 32 is pressed.

It is assumed that the operator will press the numerical keypad 31 while the operator views the window displayed on the display unit 22. For example, it is assumed that the numerical keypad 31 is operated to input a mail address when the destination is entered. At this time, an operator operates the numerical keypad 31 while the operator views the window displayed on the display unit 22 without viewing the hardware keys. As a result, the operator's little finger or the like is wrongly contacted with the start button 32 and the operator unintentionally presses the start button 32.

However, because the start button 32 is set to the gaze necessity button, the operation for the start button 32 is invalidated. On the other hand, because the numerical keypad 31 is set to the gaze non-necessity button, the operator can operate the numerical keypad 31 while the operator views the window displayed on the display unit 22.

In detail, when the operation for an optional operation button is received from the operator by the operation panel 20, the CPU 11 of the image processing apparatus 10 refers the management table 17 and confirms whether the operated operation button (in this example, the start button 32) is set to the gaze necessity button or the gaze non-necessity button. In case that the operated operation button is set to the gaze non-necessity button, the above operation is validated.

In case that the operated operation button is set to the gaze necessity button, the CPU 11 confirms whether the operator's gaze detected by the gaze detection unit 28 is directed to the operated operation button. In case that the operator's gaze is directed to the operated operation button, this operation is validated. In case that the operator's gaze is not directed to the operated operation button, this operation is not invalidated.

The process for judging the validity/invalidity of the operation, is not limited to the above. The following process can be used.

It is detected whether the operator's gaze is directed to the pressed operation button. In case that the operator's gaze is directed to the pressed operation button, the validity/invalidity of this operation is judged in accordance with the validity/invalidity information of the pressed operation button, which is registered in the item "Yes" of the management table 17. In case that the operator's gaze is not directed to the pressed operation button, the validity/invalidity of this operation is judged in accordance with the validity/invalidity information of the pressed operation button, which is registered in the item "No" of the management table 17.

As described above, in the operation panel 20 of the image processing apparatus 10, the gaze necessity button in which the operation is validated only in case that the operator's gaze is directed to the operation button when the operation button is operated, and the gaze non-necessity button in which the operation is validated regardless of whether the operator's gaze is directed to the operation button when the operation button is operated, are provided. By setting the operation button in which a situation caused by a wrong operation cannot be repaired, to the gaze necessity button, and by setting the operation button in which a situation can be repaired even though a wrong operation is carried out, to the gaze non-necessity button, it is possible to avoid the wrong operation which causes the irreparable situation. Further, because the convenience of the normal operation button can be maintained, it is possible to secure the convenience in the normal operation (the convenience of operating the operation button while the operator views another portion).

Next, the case in which the setting relating to the necessity of the gaze for one operation button is changed according to the window displayed on the display unit 22, is explained.

Figure 9:
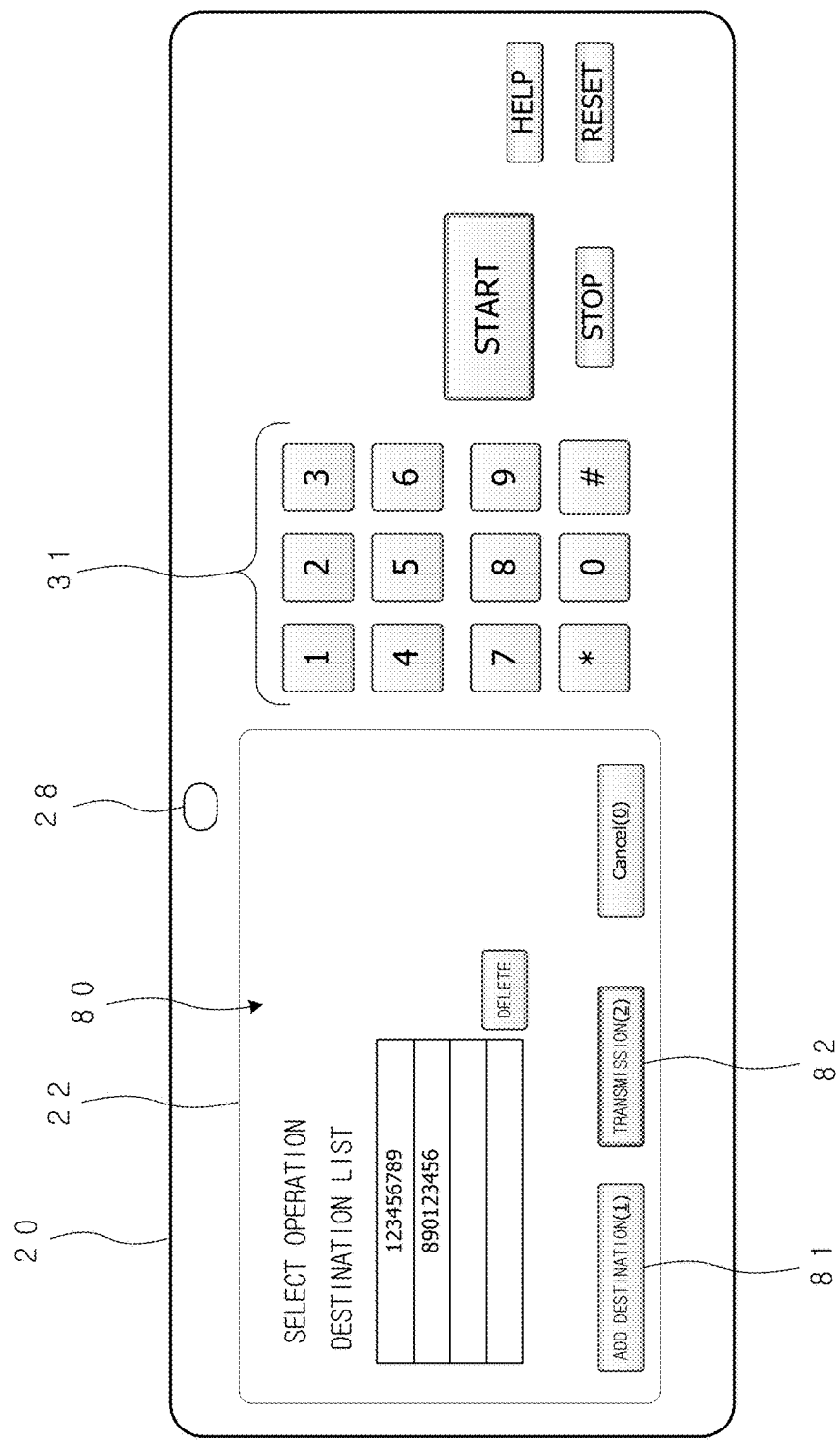
FIG. 9 is a view showing the operation panel according to the first embodiment in the situation in which the destination operation window is displayed on the display unit.

FIG. 9 shows the operation panel 20 in the situation in which the destination operation window 80 is displayed on the display unit 22. In the destination operation window 80, the operation for executing the transmission to the destination which is currently entered, and the operation for adding a new destination to the destination list, are received. The numerical keypad 31 is normally used in order to input the number. However, in the destination operation window 80 shown in FIG. 9, the numerical keypad 31 is used as shortcut keys.

Specifically, the key (1) has the same function as the destination addition button 81. The key (2) has the same function as the transmission execution button 82. Therefore, in the situation in which the destination operation window 80 is displayed on the display unit 22, the image processing apparatus 10 sets each key of the numerical keypad 31 to the gaze necessity button.

Figure 10:
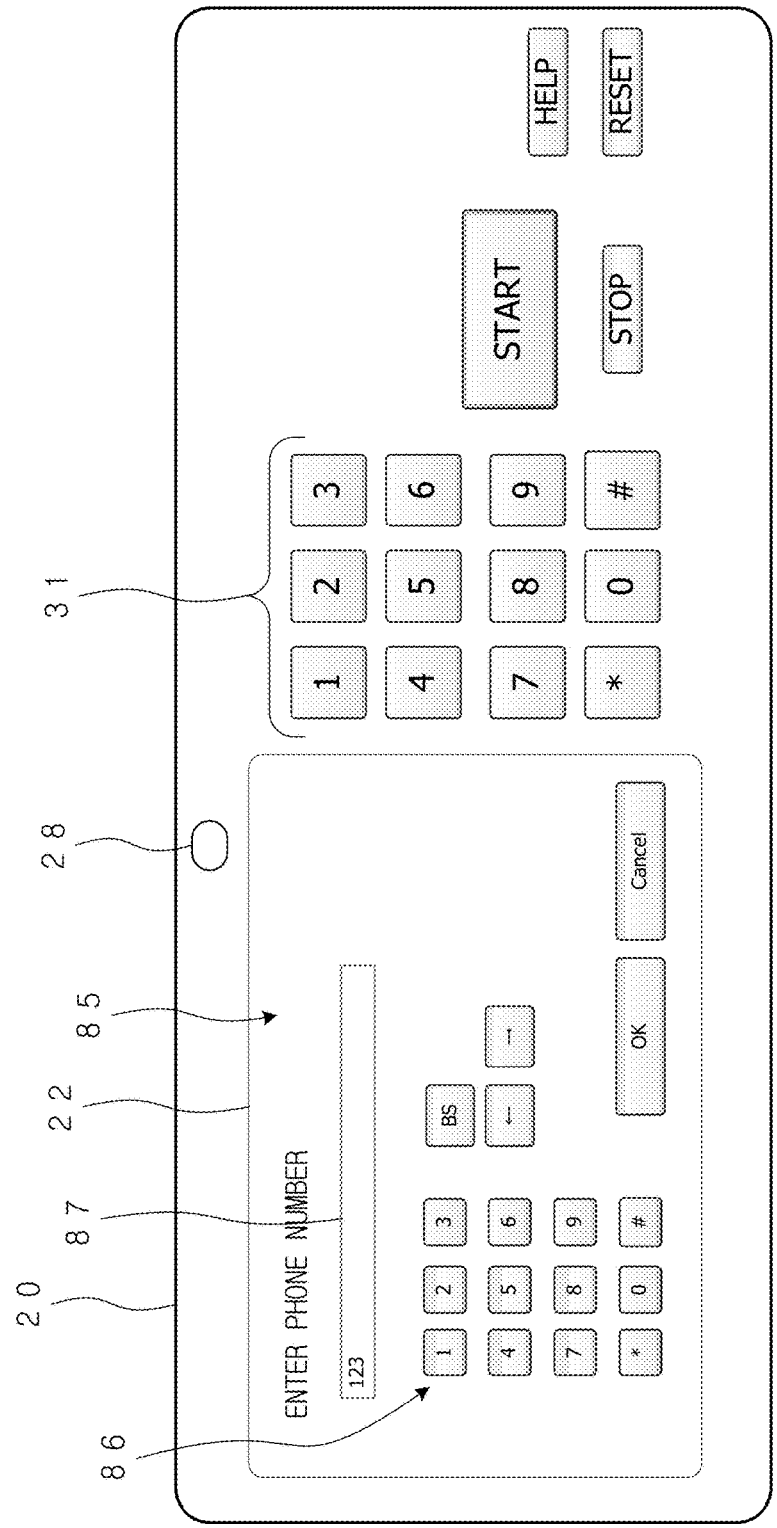
FIG. 10 is a view showing the operation panel according to the first embodiment in the situation in which the destination entry window is displayed on the display unit.

For example, in case that the operator's gaze is directed to the key (1) when the key (1) is pressed in the situation in which the window operation window 80 is displayed on the display unit 22, the image processing apparatus 10 changes the window displayed on the display unit 22 to the destination entry window 85 shown in FIG. 10 like the case in which the destination addition button 81 is operated.

On the other hand, in case that the operator's gaze is not directed to the key (1) when the key (1) is pressed in the situation in which the window operation window 80 is displayed on the display unit 22, the image processing apparatus 10 invalidates the operation for the key (1).

Further, as shown in FIG. 9, in case that the operator's gaze is directed to the key (2) when the key (2) is pressed in the situation in which the window operation window 80 is displayed on the display unit 22, the image processing apparatus 10 validates the operation for the key (2), and executes the transmission process like the case in which the transmission execution button 82 is operated.

On the other hand, in case that the operator's gaze is not directed to the key (2) when the key (2) is pressed in the situation in which the window operation window 80 is displayed on the display unit 22, the image processing apparatus 10 invalidates the operation for the key (2), and does not execute the transmission process.

In the destination entry window 85 shown in FIG. 10, the numerical keypad 31 is used in order to input the number. In the situation in which the destination entry window 85 is displayed on the display unit 22, the image processing apparatus 10 sets each key of the numerical keypad 31 to the gaze non-necessity button. The numerical keypad 86 displayed on the destination entry window 85 shown in FIG. 10, is a software keypad. When any key of the numerical keypad 86 is pressed, the number is entered in the destination box 87.

For example, even though the operator's gaze is not directed to the key (1) of the hardware numerical keypad 31 by virtue of viewing the destination entry window 85 when the above key (1) is operated in the situation in which the destination entry window 85 is displayed on the display unit 22, the image processing apparatus 10 validates the operation for the key (1). Specifically, the entry of the number "1" is accepted and the number "1" is additionally displayed in the destination box 87.

FIG. 11 shows the shows the management table 17 for changing the setting of each operation button to the gaze necessity button or to the gaze non-necessity button for each window. In the management table 17 shown in FIG. 11, the setting (validation/invalidation information) for the case in which the destination operation window 80 is displayed and the setting (validation/invalidation information) for the case in which the destination entry window 85 is displayed are registered for each operation button. In this example, the key (1), the key (2), the key (3), . . . are set to the gaze necessity button in case that the destination operation window 80 is displayed, and are set to the gaze non-necessity button in case that the destination entry window 85 is displayed. That is, the setting of the predetermined button is automatically changed to the gaze necessity button or the gaze non-necessity button according to the window displayed on the display unit 22.

The CPU 11 has a function as the setting changing unit for automatically changing the setting of each operation button. Specifically, the CPU 11 has a function as the setting changing unit for changing the setting of each operation button to the gaze necessity button or to the gaze non-necessity button. More specifically, when an optional operation button is operated, the CPU 11 specifies the window which is currently displayed on the display unit 22 and obtains the validity/invalidity information corresponding to the specified window. Then, in accordance with the obtained validity/invalidity information, the CPU 11 recognizes whether the operated operation button is set to the gaze necessity button or the gaze non-necessity button.

Next, the case in which the setting relating to the necessity of the gaze for one operation button is changed according to the function mode (type of the job), is explained.

The image processing apparatus 10 has a plurality of function modes corresponding to the types of jobs which are input and set. When the image processing apparatus 10 receives the operation for setting and inputting each job, the image processing apparatus 10 receives the selection of the function mode. For example, in case that the operation for setting and inputting a copy job is carried out, a user selects the copy mode which is one of the function modes. When the image processing apparatus 10 receives the operation for selecting the copy mode, the image processing apparatus 10 displays the window for setting the copy job on the display unit 22, and receives various types of setting operations.

The function mode includes the copy mode for setting and inputting a copy job, the scan mode for receiving the setting and the inputting of a scan job, such as a Scan To Email transmission, the facsimile mode for receiving the setting and the inputting of a facsimile job, the BOX mode for receiving the setting and the inputting of a box job for inputting and outputting data to/from a box, and the like. The box is a storing area which is assigned to each user or each group. Normally, an ID and a password are set to each box. By using the ID, the box is selected. In order to print a file stored in the box, it is required to input a correct password.

FIG. 12 shows an example of the management table 17 in which the setting (validity/invalidity information) for setting one operation button to the gaze necessity button or the gaze non-necessity button is registered for each function mode. In FIG. 12, the setting which is applied to the start button 32 in the copy mode, the setting which is applied to the start button 32 in the scan mode, the setting which is applied to the start button 32 in the facsimile mode and the setting which is applied to the start button 32 in the BOX mode are registered.

The CPU 11 refers the validity/invalidity information registered in the management table 17, which corresponds to the selected function mode. Therefore, the setting of the start button 32 is automatically changed to the gaze necessity button or the gaze non-necessity button according to the selected function mode.

In the example of FIG. 12, the setting of the start button 32 is automatically changed so as to set the start button 32 to the gaze non-necessity button in the copy mode and the BOX mode and to set the start button 32 to the gaze necessity button in the scan mode and the facsimile mode. Because the transmission process is executed in the scan mode and the facsimile mode, a wrong operation for the start button 32 is a significant error which causes the irreparable situation. Therefore, the start button 32 is set to the gaze necessity button in these modes.

Figure 13:
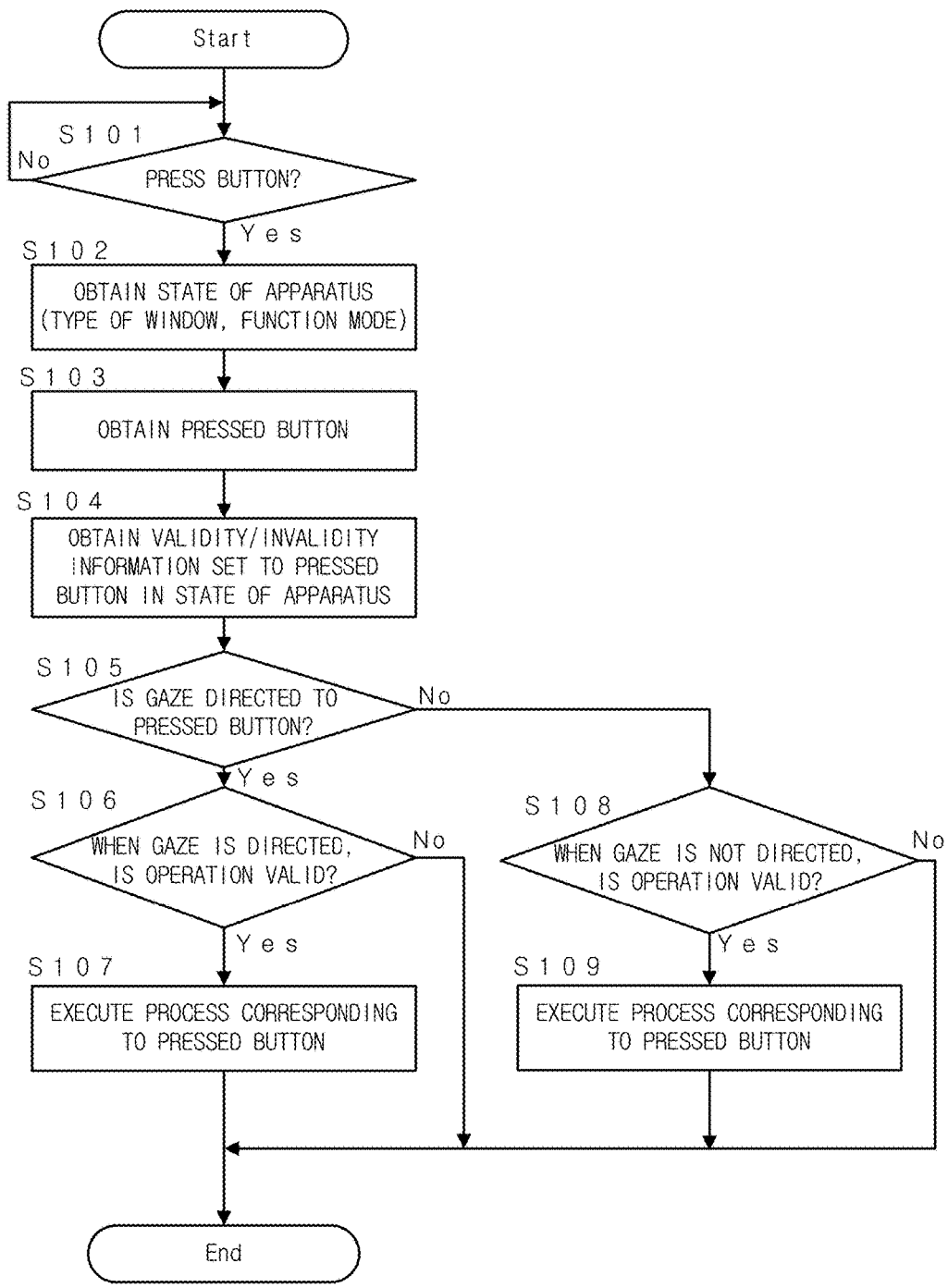
FIG. 13 is a flowchart showing the process which is carried out by the image processing apparatus for receiving the operation for the operation button, according to the first embodiment.

FIG. 13 shows the flowchart of the process which is carried out by the image processing apparatus 10 for receiving the operation for the operation button. When any one of the operation buttons provided on the operation panel 20 is pressed (Step S101; Yes), the CPU 11 of the image processing apparatus 10 obtains the information indicating the state of the apparatus (Step S102). In this embodiment, as the information indicating the state of the apparatus, the CPU 11 obtains the current function mode and the identification information of the window which is currently displayed on the display unit 22 (window ID or the like).

Further, the CPU 11 obtains the information for specifying the pressed operation button (Step S103).

Next, the CPU 11 refers a part of the management table 17, which corresponds to the operation button specified in Step S103 and the state of the apparatus, which is obtained in Step S102, and obtains the validity/invalidity information which is set to the operation button in the state of the apparatus (Step S104).

Next, the CPU 11 recognizes whether the operator's gaze is directed to the pressed operation button or not in accordance with the detection result obtained by the gaze detection unit 28 (Step S105). In case that the operator's gaze is directed to the pressed operation button (Step S105; Yes), the CPU 11 confirms whether the contents of the validation/invalidation information obtained in Step S104 are the settings for validating the operation when the operator's gaze is directed to the pressed operation button (Step S106).

In case that the contents of the validation/invalidation information obtained in Step S104 are the settings for validating the operation when the operator's gaze is directed to the pressed operation button (Step S106; Yes), the CPU 11 judges that the current operation for the operation button is valid and executes the corresponding process (Step S107). Then, the process is ended (End).

In case that the contents of the validation/invalidation information obtained in Step S104 are the settings for invalidating the operation when the operator's gaze is directed to the pressed operation button (Step S106; No), the CPU 11 judges that the current operation for the operation button is invalid. Then, the process is ended (End).

In case that the operator's gaze is not directed to the pressed operation button (Step S105; No), the CPU 11 confirms whether the contents of the validation/invalidation information obtained in Step S104 are the settings for validating the operation when the operator's gaze is not directed to the pressed operation button (Step S108).

In case that the contents of the validation/invalidation information obtained in Step S104 are the settings for validating the operation when the operator's gaze is not directed to the pressed operation button (Step S108; Yes), the CPU 11 judges that the current operation for the operation button is valid and executes the corresponding process (Step S109). Then, the process is ended (End).

In case that the contents of the validation/invalidation information obtained in Step S104 are the settings for invalidating the operation when the operator's gaze is not directed to the pressed operation button (Step S108; No), the CPU 11 judges that the current operation for the operation button is invalid. Then, the process is ended (End).

The operation display device 40 executes the operation which is the same as the above operation.

As described above, in the image processing apparatus 10 and the operation display device 40 according to the first embodiment, the operation button in which a situation caused by a wrong operation cannot be repaired, can be set to the gaze necessity button, and the operation button in which a situation can be repaired even though a wrong operation is carried out, can be set to the gaze non-necessity button. Therefore, in case that the operator does not view the operation button in which a situation caused by a wrong operation cannot be repaired, the operation for the above operation button is invalidated. In case of the operation button in which the situation can be repaired even though a wrong operation is carried out, the operator's gaze does not influence the validity/invalidity of the operation for the above operation button. That is, regardless of the operator's gaze, the operation for the above operation button is validated. Therefore, it is possible to avoid the wrong operation for the specific operation button, which causes an irreparable situation. Further, because the convenience of the normal operation button can be maintained, it is possible to secure the convenience in the normal operation (the convenience of operating the operation button while the operator views another portion).

Further, because the setting relating to the necessity of the gaze for each operation button is automatically changed according to the type of window displayed on the display unit 22 or 49, or according to the selected function mode, it is possible to deal with the case in which the function and the like of the operation button is changed according to the state of the apparatus.

As described above, the first embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

In the first embodiment, the image processing apparatus 10 is a multi-function peripheral. However, as long as the apparatus comprises an image processing unit and an operating device for receiving the operation for setting and inputting a job to be executed by the image processing unit, the present invention can be applied to another type of apparatus, such as a copy machine, a printer or the like.

The start button 32 and the stop button 33 are explained as the gaze necessity button. It is preferable to set the operation button for receiving any one of the operation for starting the process, the operation for confirming the input contents, the operation for stopping the process and the operation for resetting the input value, to the gaze necessity button because a situation caused by a wrong operation for the above operation button cannot be repaired. On the other hand, preferably, the operation button for receiving the instruction except the operation for starting the process, the operation for confirming the input contents, the operation for stopping the process and the operation for resetting the input value, is set to the gaze non-necessity button. The operation button for resetting the input value is included in the gaze necessity button because all of the input values which are entered with effort are prevented from being deleted by inadvertently pressing the rest button.

The operation button for which the necessity of the gaze is judged is not limited to hardware keys, and may be an operation button (software keys) displayed on the display unit 22 or the like, or an optional operation button for receiving the operation from the operator.

In this embodiment, in case of the gaze necessity button, when the operator's gaze is directed to the operated operation button, the operation for the above operation button is validated. In case that the operator's gaze is not directed to the operated operation button, the operation for the operated operation button may be invalidated. The condition for the validating the operation may include the condition except the gaze. Further, in case of the gaze non-necessity button, the operation for the operation button is validated regardless of the operator's gaze. However, it is not necessary to include the gaze in the condition for judging the validity/invalidity of the operation for the above operation button. For example, in accordance with another condition, the validity/invalidity of the operation may be judged.

Figure 14:
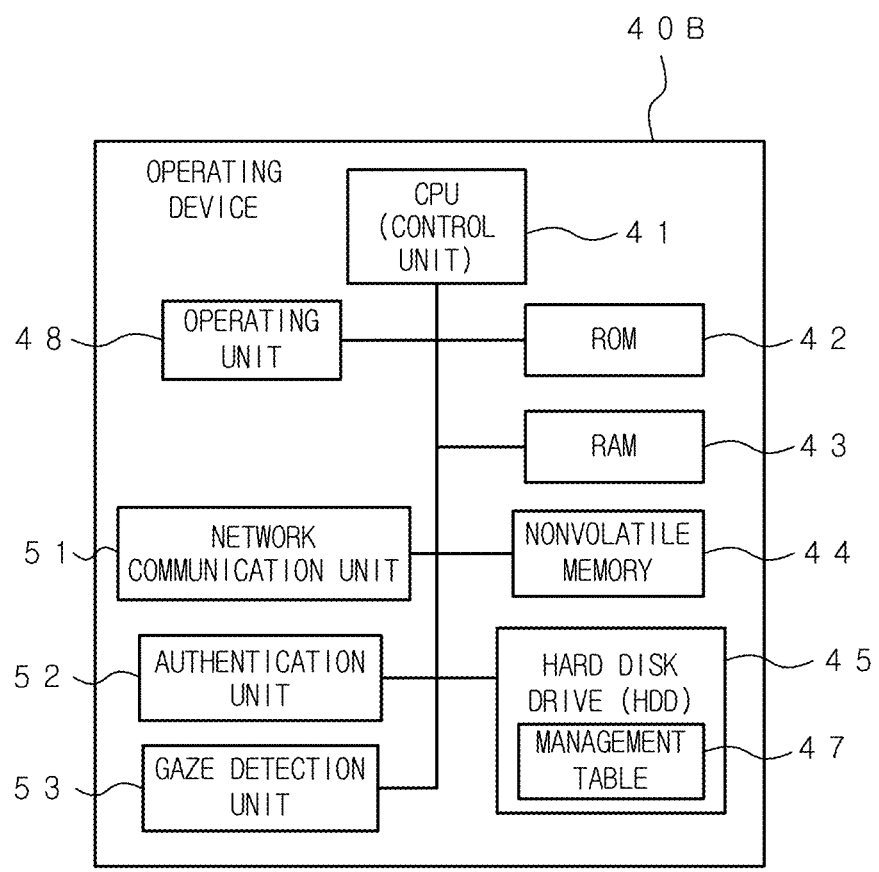
FIG. 14 is a block diagram showing the operating device in which the display unit is removed from the operation display device according to the first embodiment.

In this embodiment, the operation display device 40 for remotely operating the image processing apparatus 10 is explained as the operating device. The operating device is not limited to the operation display device 40. As shown in FIG. 14, the operating device is configured as an operating device 40B in which the display unit 49 is removed from the operation display device 40 shown in FIG. 3.

In this embodiment, it is judged whether the operator's gaze is directed to the area in which the operation button is provided, which is a predetermined area relating to the operation button. It is not necessary that the effective area for judging the gaze directed to each operation button is coincident with the area in which the operation button is provided. For example, the above effective area (the predetermined area relating to the operation button) may be set to the area including the operation button and the periphery of the operation button, the predetermined center area of the operation button or the area in which the text indicating the function of the operation button is displayed. Further, in case of the numerical keypad, the effective area for judging the gaze directed to each key is an area in which each key is provided. For example, the effective area for judging the gaze directed to each key may be set to the area in which the numerical keypad (key group) is provided.

In this embodiment, a user can optionally change the contents registered in the management table 17. The image processing apparatus or the operating device in which a user cannot change the contents which are previously registered, may be configured.

Further, in this embodiment, the validity/invalidity of the operation is judged in accordance with the position of the operator's gaze which is directed when the operation button is pressed. The position of the operator's gaze which is directed immediately before the operation button is pressed may be considered. For example, in case that a user confirms the position of the operation button by directing the user's gaze immediately before the operation button is pressed and when the user's finger approaches the operation button, the user's gaze is directed to another portion, the above operation can be judged as the valid operation.

Second Embodiment

Next, the second embodiment will be explained in accordance with the drawings. Hereinafter, the elements which are the same as the elements of the first embodiment are denoted by the same reference numerals as the first embodiment, and the explanation thereof is omitted.

The image processing apparatus 110 and the operation display device 140 according to the second embodiment, detect the operator's gaze. When the operation button is operated, the image processing apparatus 110 and the operation display device 140 examines whether the operator's gaze is directed to the effective area for judging the gaze, which is set for the operated operation button. In case that the operator's gaze is directed to the effective area which is set for the operated operation button, the current operation is validated. In case that the operator's gaze is not directed to the effective area, the current operation is invalidated. Because the image processing apparatus 110 according to the second embodiment is different from the image processing apparatus 10 according to the first embodiment only in that the hard disk drive 115 is provided instead of the hard disk drive 15 according to the first embodiment, only the hard disk drive 115 is explained in this embodiment. Further, because the operation display device 140 according to the second embodiment is different from the operation display device 40 according to the first embodiment only in that the hard disk drive 145 is provided instead of the hard disk drive 45 according to the first embodiment, only the hard disk drive 145 is explained in this embodiment.

Figure 15:
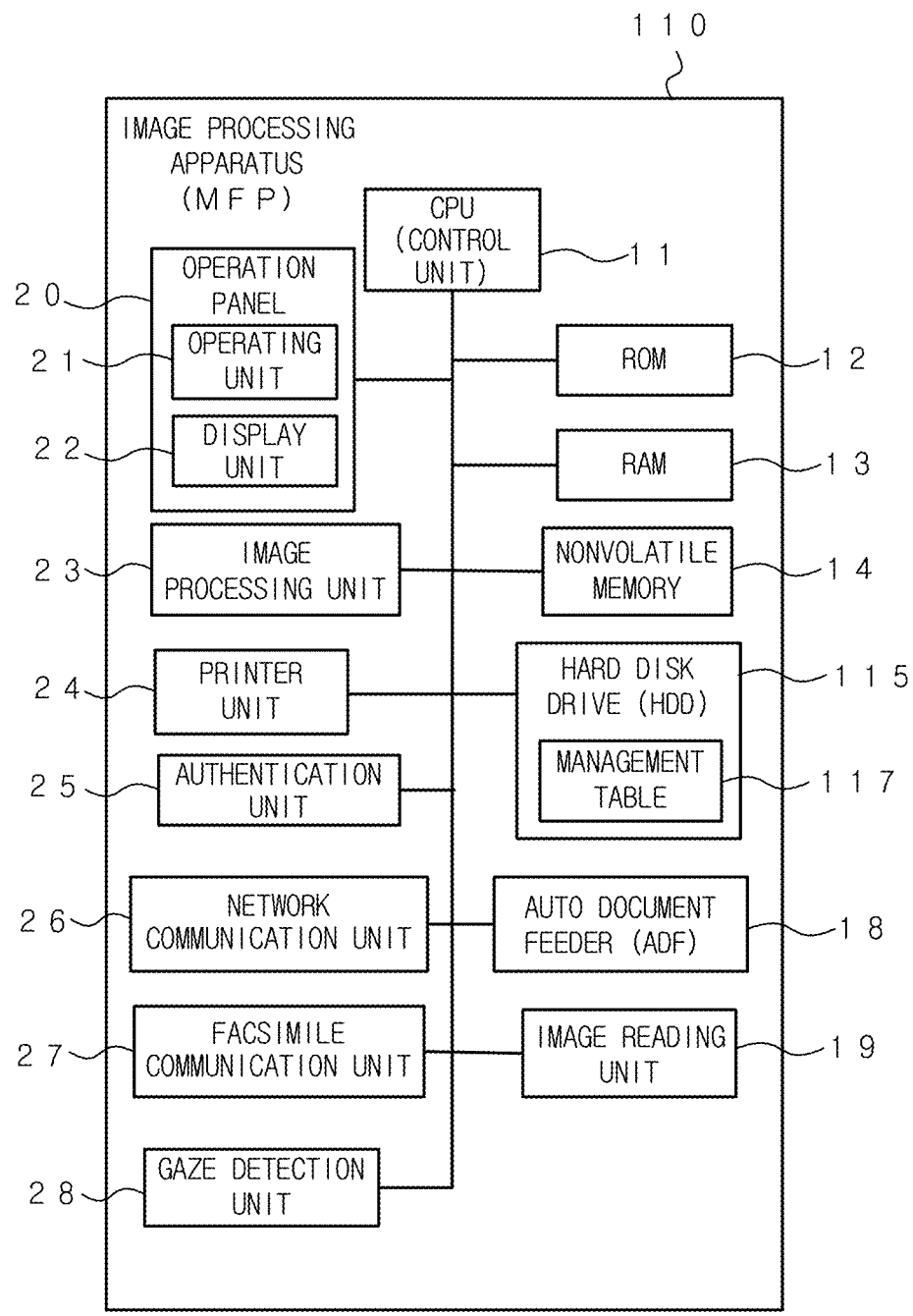
FIG. 15 is a block diagram showing the schematic configuration of the image processing apparatus according to the second embodiment.

The hard disk drive 115 of the image processing apparatus 110 according to the second embodiment is a large-capacity nonvolatile storing device. In the hard disk drive 115, various types of programs and data are stored in addition to print data, data relating to windows to be displayed. In the hard disk drive 115, as shown in FIG. 15, a management table 117 for registering each operation button and the effective area for judging the gaze, which is set for each operation button, so as to relate the operation button to the effective area, and the like, is stored.

Figure 16:
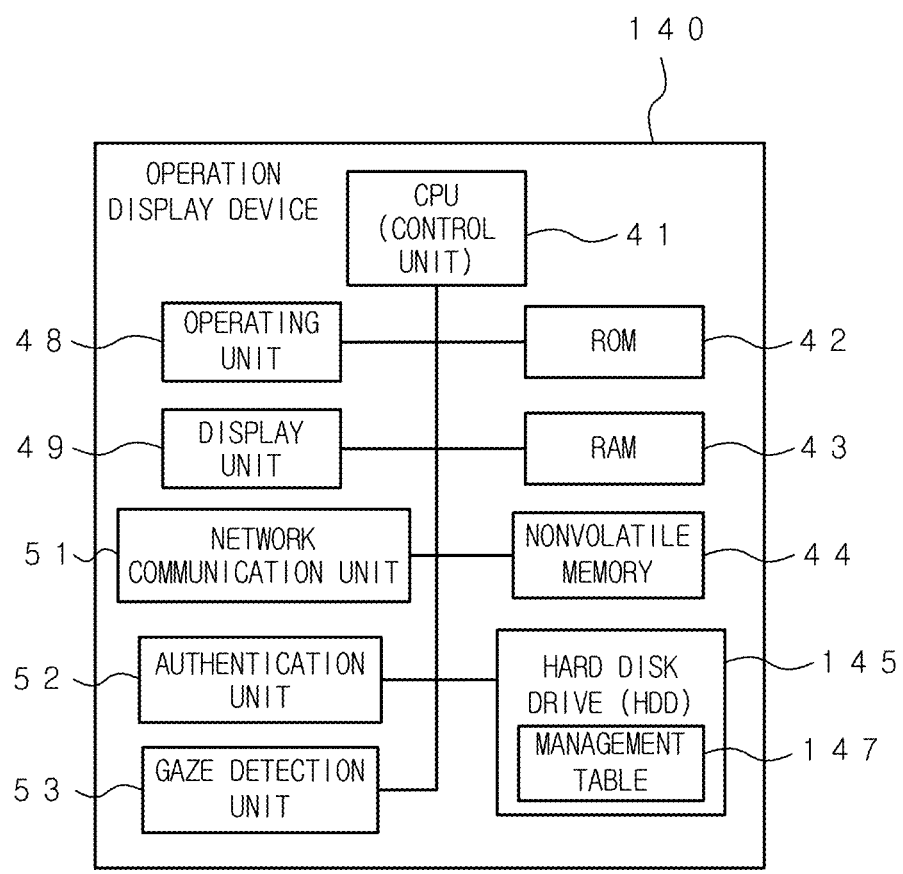
FIG. 16 is a block diagram showing the schematic configuration of the operation display device according to the second embodiment.

Further, the hard disk drive 145 of the operation display device 140 is a large-capacity nonvolatile storing device. In the hard disk drive 145, various types of programs and data are stored in addition to data relating to windows to be displayed. In the hard disk drive 145, as shown in FIG. 16, a management table 147 which is the same as the management table 117 of the image processing apparatus 110, and the like, is stored.

Next, the operation for receiving the operations on the operation panel 20 of the image processing apparatus 110 from the operator, will be explained. The image processing apparatus 110 and the operation display device 140 carry out the same operation for receiving the operations from the operator. Therefore, in this embodiment, the operation of the image processing apparatus 110 will be explained and the explanation of the operation of the operation display device 140 is omitted.

Figure 17:
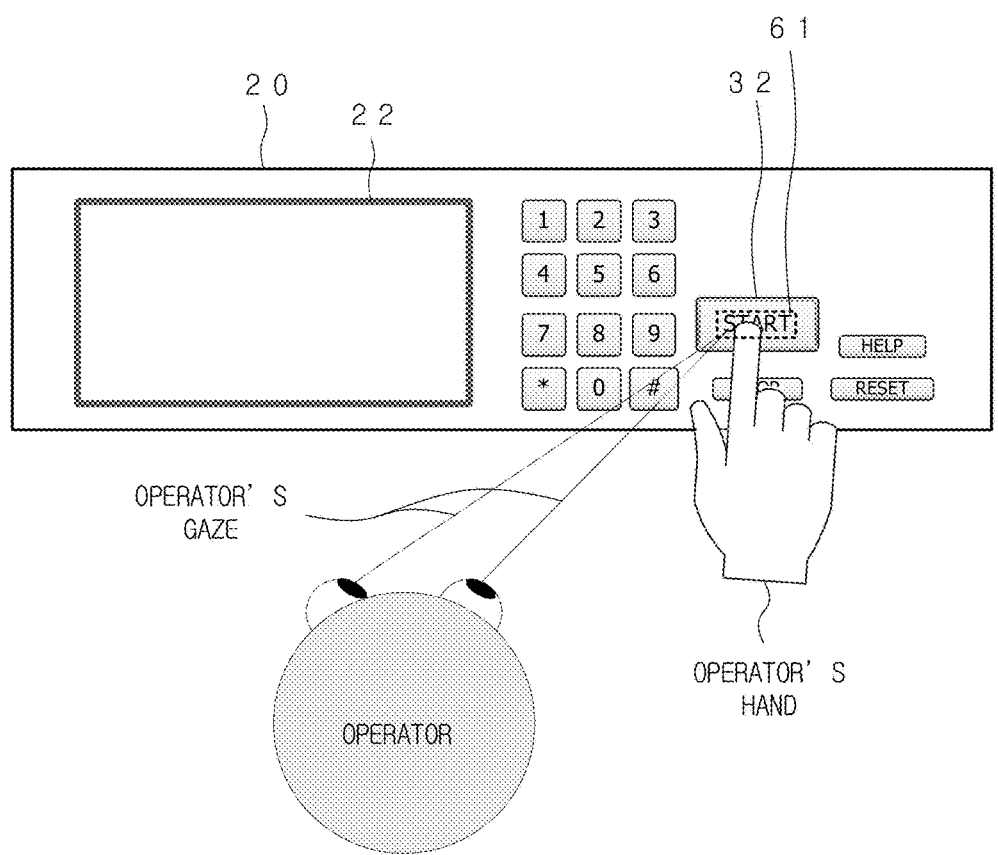
FIG. 17 is a view showing the situation in which an operator operates the start button while the operator views the indication "START" indicated in the center portion of the start button in the second embodiment.

FIG. 17 shows the situation in which the operator operates the start button 32 while the operator views the indicating "START" indicated in the center portion of the start button 32. As explained in the first embodiment, the start button 32 is an important operation button for instructing the start of the job execution. A wrong operation for the start button 32 is a significant error which causes the irreparable situation.

Therefore, in the second embodiment, the effective area 61 which is set for the start button 32 is set to the center portion of the start button 32 (the rectangular area including the portion in which the indication "START" is described). In case that the operation for the start button 32 is received from the operator, when the operator views the effective area 61 which is set for the start button 32 (when the operator's gaze is directed to the effective area 61), the image processing apparatus 110 judges that the operation for the start button 32 is valid and accepts the above operation.

Figure 18:
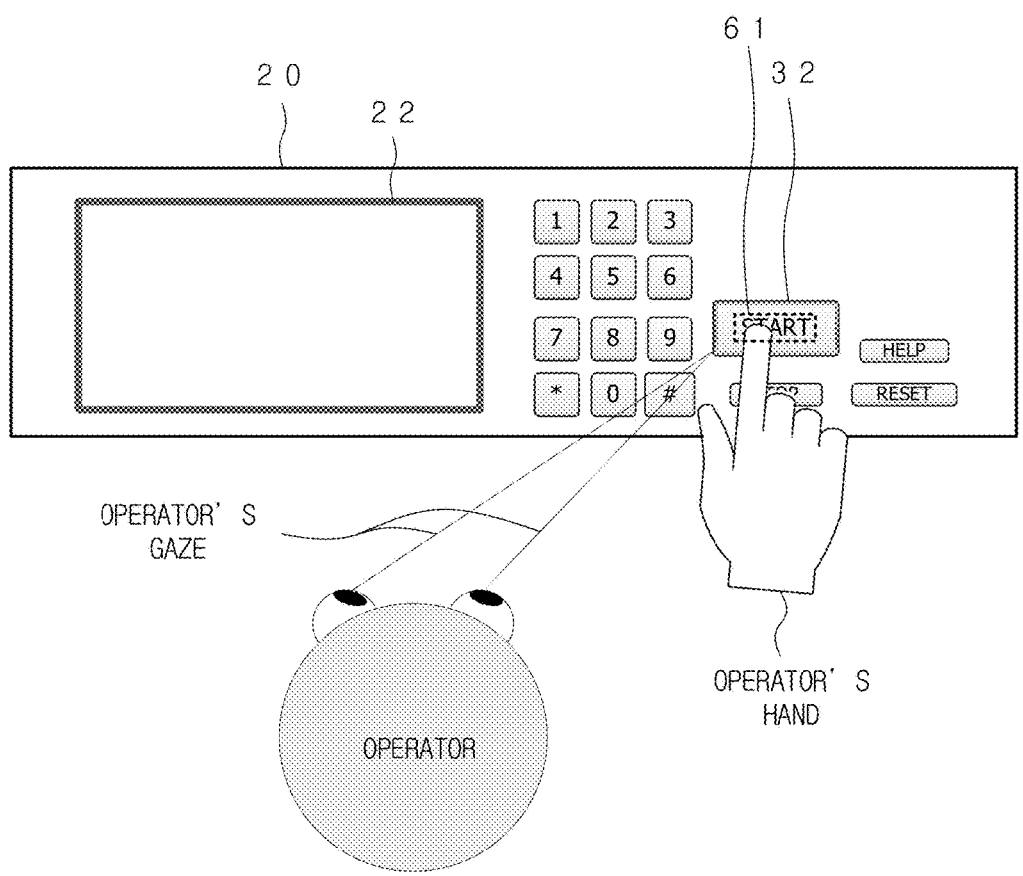
FIG. 18 is a view showing the situation in which an operator operates the start button without viewing the indication indicated in the start button in the second embodiment.

On the other hand, in case that the operator does not view the effective area 61 which is set for the start button 32, the image processing apparatus 110 judges that the operation for the start button 2 is invalid and does not accept the above operation. In the example of FIG. 18, when the operation for the start button 32 is received from the operator, the operator views the start button 32. However, because the operator views not the indication "START" but the edge portion of the start button (which is out of the effective area), the image processing apparatus 110 judges that the operation for the start button 32 is invalid and does not accept the above operation.

In case that the start button 32 is operated while the operator views the display unit 22, because the operator's gaze is not directed to the effective area 61 which is set for the start button 32, the above operation is invalidated.

Figure 19:
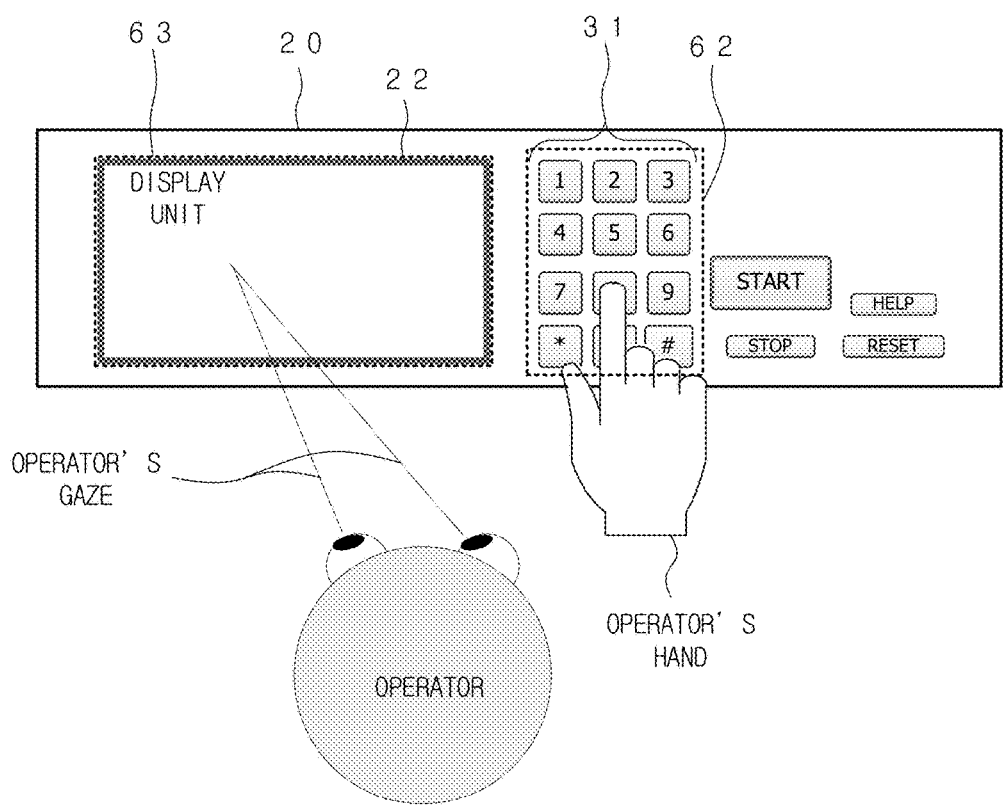
FIG. 19 is a view showing the situation in which an operator operates the numerical keypad while the operator views the display unit in the second embodiment.

FIG. 19 shows the situation in which the operator operates the numerical keypad 31 while the operator views the display unit 22. As explained in the first embodiment, a wrong operation for the numerical keypad 31 is a slight error which can be repaired because the input contents can be modified. In the second embodiment, the input operation which is carried out while the operator views the numerical keypad 31, and the input operation which is carried out while the operator views the display unit 22, are allowed. The effective area 62 corresponding to the area in which the numerical keypad 31 is provided, and the effective area 63 corresponding to the area in which the display unit 22 is provided are set for the numerical keypad 31.

In case that the operator's gaze is directed to one of the effective area 62 and the effective area 63 set for the numerical keypad 31 when the operation for the numerical keypad 31 is received from the operator, the image processing apparatus 110 judges that the operation for the numerical keypad 31 is valid and accepts the above operation. For example, as shown in FIG. 19, even in case that the operator operates the numerical keypad 31 while the operator views the display unit 22, the image processing apparatus 110 judges that the operation for the numerical keypad 31 is valid and accepts the above operation.

Figure 20:
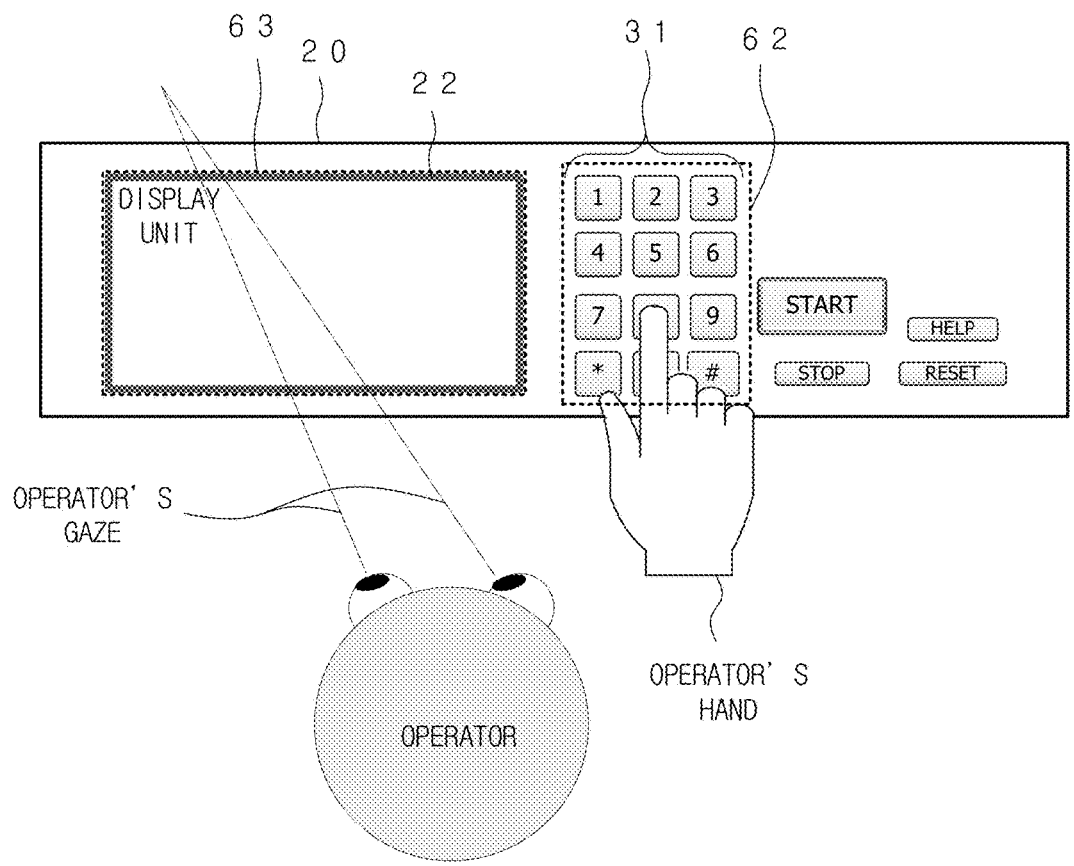
FIG. 20 is a view showing the situation in which an operator operates the numerical keypad without viewing the effective area set for the numerical keypad in the second embodiment.

However, as shown in FIG. 20, in case that the operator's gaze is removed from both of the effective area 62 and the effective area 63 when the operation for the numerical keypad 31 is received, the image processing apparatus 110 judges that the operation for the numerical keypad 31 is invalid and does not accept the above operation.

As described above, in the image processing apparatus 110 according to the second embodiment, in case of an important operation button, such as the start button 32, in which a wrong operation is strictly avoided, the area in which the operation button is provided (or only the center portion thereof) is set as the effective area. On the other hand, in case of the operation button, such as the numerical keypad 31, in which a wrong operation hardly has a bad influence, an area which is wider than the area in which the operation button is provided can be set as the effective area. That is, in the image processing apparatus 110, the ratio of the size of one operation button to the size of the effective area set for one operation button can be set so as to differ from the ratio of the size of another operation button to the size of the effective area set for another operation button.

As described above, in case of the important operation button in which a wrong operation is strictly avoided, the area in which the operation button is provided or an area which is smaller than the area in which the operation button is provided is set as the effective area. As a result, the shift of the operator's gaze from the operation button is not allowed. In case of the operation button in which a wrong operation can be allowed to a certain degree, the area which is wider than the area in which the operation button is provided is set as the effective area. As a result, the shift of the operator's gaze from the operation button is allowed to a certain degree. Thereby, the effective area having the size according to the necessity of the avoidance of the wrong operation for the operation button can be set for each operation button.

Figure 21:
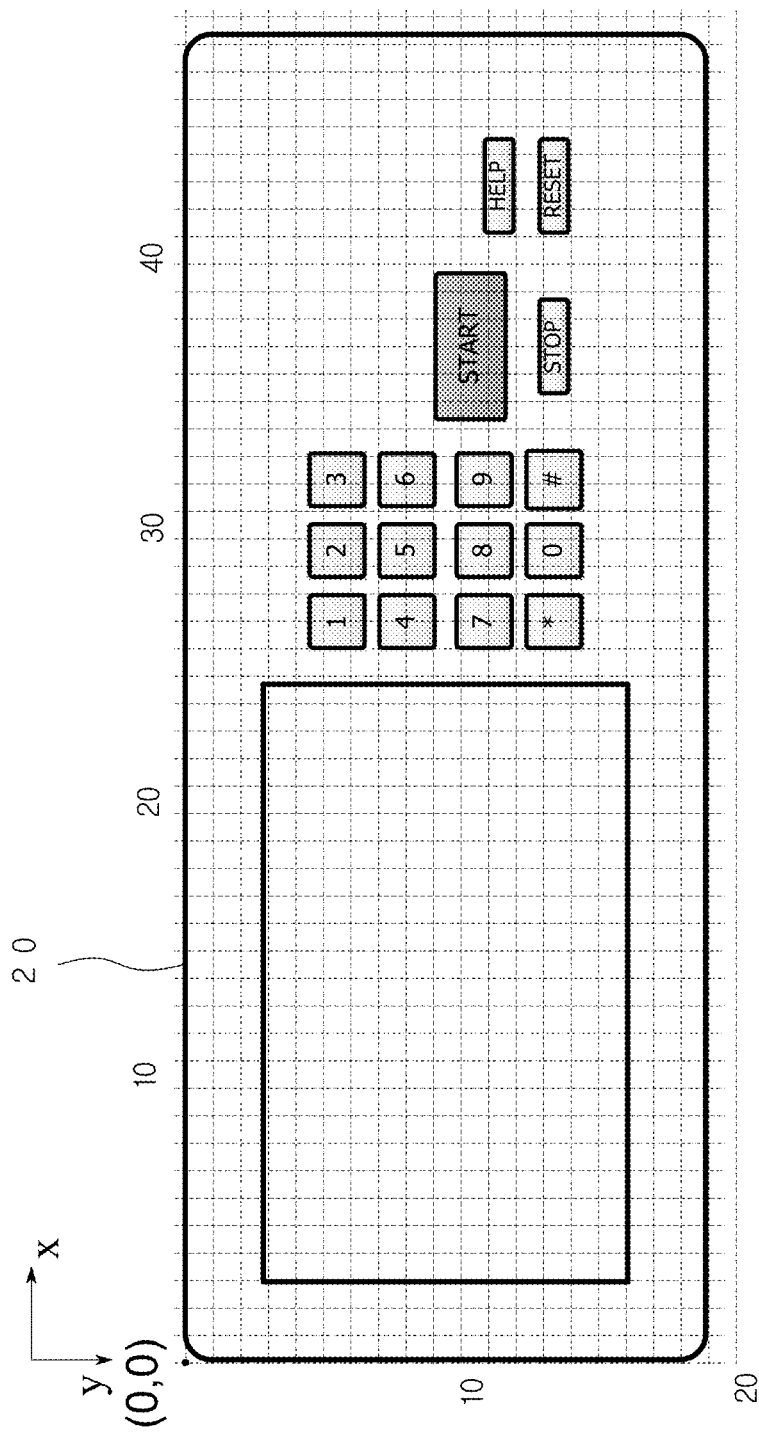
FIG. 21 is a view showing the XY coordinate defined in the operation panel according to the second embodiment.

FIG. 21 shows the XY coordinate defined in the operation panel 20. In the coordinate, the upper left corner of the operation panel 20 is set to the origin. The longitudinal direction of the operation panel 20 is defined as the X direction. The lateral direction thereof is defined as the Y direction. For example, one increment in the coordinate corresponds to 1 cm on the operation panel 20. The effective area is defined by the coordinate information on the coordinate. For example, the rectangle effective area is defined by two coordinate points which are diagonally arranged.

In the image processing apparatus 110, firstly, a plurality of optional effective areas are defined on the XY coordinate shown in FIG. 21.

FIG. 22 shows an example of the list of a plurality of defined effective areas. Each effective area is defined by the area name, the area definition and the area type. The area name is an identification name which is assigned to each defined effective area. In this embodiment, five types of effective areas having the area names "R_START", "R_TENKEY", "R_STOP" AND "R_ANY", respectively are defined.

The area type indicates that the shape of the area to be defined is "rectangle" or the area is "any portion". The any portion indicates that the operation is validated regardless of the position of the operator's gaze.

The area definition indicates two diagonal points for defining the rectangle as the effective area in case that the area type is "rectangle". In case that the area type is "any portion", the area definition is not registered.

By relating the area name of the effective area defined as described above, to the operation button, the effective area is defined for each operation button.

FIG. 23 shows an example of the management table 117 in which the effective area information is registered for each operation button so as to relate the operation button name to the area name of the effective area which is set for the operation button. In this example, the effective area having the area name of "R_START" is set for the start button 32. Further, the effective area having the area name of "R_STOP" is set for the stop button 33. In these settings, the ratio of the size of the area in which the operation button is provided to the size of the effective area is about 1.

The effective area having the area name of "R_ANY" is set for each of the key (1) (input button for inputting the number 1) and the key (2) (input button for inputting the number 2). The effective area having the area name of "R_ANY" has the area type of "any portion". In case of the key (1) and the key (2), the ratio of the effective area to the area in which the key is provided is infinite.

According to the management table 117 shown in FIG. 23, the operation for the start button 32 is validated in case that the operator's gaze is directed to the effective area (R_START), and is invalidated in case that the operator's gaze is not directed to the effective area (R_START). Similarly, the operation for the stop button 33 is validated in case that the operator's gaze is directed to the effective area (R_STOP), and is invalidated in case that the operator's gaze is not directed to the effective area (R_STOP).

The operation for each of the key (1) and the key (2) is validated even though the operator's gaze is directed to any portion. That is, the operation is validated regardless of the position of the operator's gaze.

Figure 24:
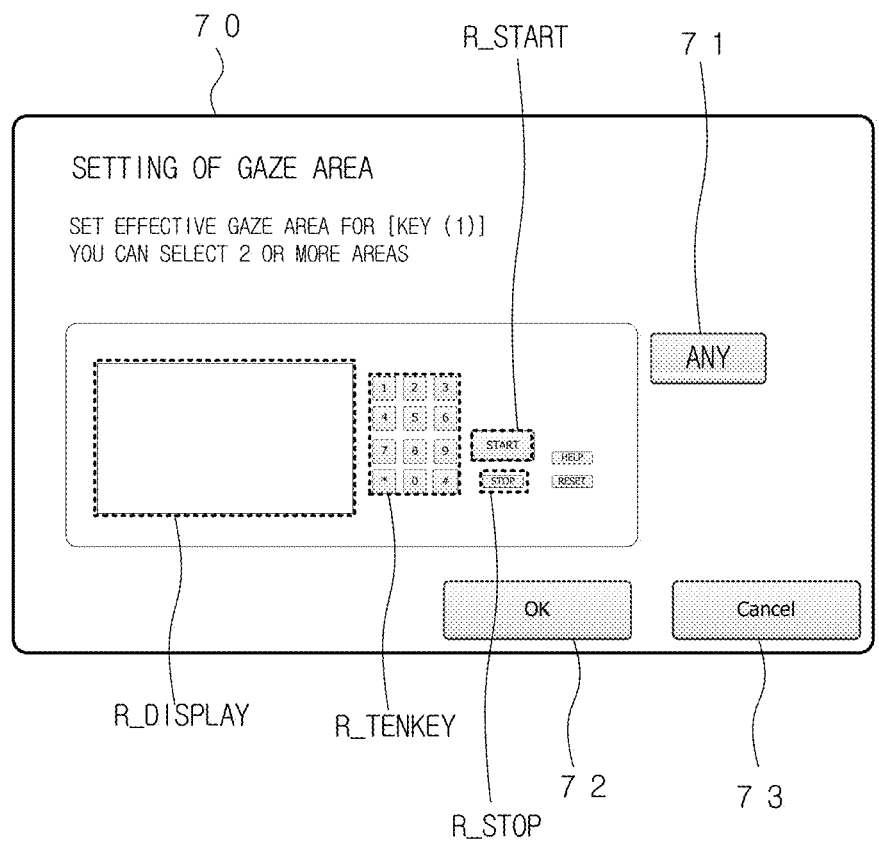
FIG. 24 is a view showing an example of the gaze area setting window for changing the setting of the effective area for each operation button by a user.

FIG. 24 shows an example of the gaze area setting window 70 for changing the setting of the effective area for each operation button by a user. FIG. 24 shows the case in which the effective area is set for the key (1). The definition of the effective area, which is shown in FIG. 22, is previously carried out.

In the gaze area setting window 70, the operation panel 20 is simulatively displayed and each defined effective area is displayed so as to overlap it with the operation panel 20 which is simulatively displayed. Further, the any button 71, the OK button 72 and the cancel button 73 are displayed. The any button 71 is used when the effective area (R_ANY) having the type of "any portion" is selected.

When a user touches the effective area displayed so as to be overlapped with the operation panel 20 which is simulatively displayed, the effective area is selected. A user can select a plurality of effective areas. When the operation for the OK button 72 is received after one or more effective areas are selected, the effective area for the corresponding operation button (in this example, the key (1)) is determined and registered. The cancel button 73 is an operation button for cancelling the state in which the effective area is selected.

For example, in case that a user wants to validate the operation for the key (1) only when the gaze is directed to the area of the numerical keypad 31 (R_TENKEY) or the area of the display unit 22 (R_DISPLAY), the user selects the area of R_TENKEY and the area of R_DISPLAY and presses the OK button 72. At this time, in the management table 117, the effective area information is registered for the key (1) as shown in FIG. 25.

Specific Example 1: In Case of the Execution of the Scan to Email Transmission Job In the second embodiment, it is assumed that the operator will press the numerical keypad 31 while the operator views the window displayed on the display unit 22. For example, it is assumed that the numerical keypad 31 is operated to input a mail address when the destination is entered. At this time, the operator operates the numerical keypad 31 while the operator views the window displayed on the display unit 22 without viewing the hardware keys. As a result, the operator's little finger or the like is wrongly contacts with the start button 32 and the operator unintentionally presses the start button 32.

However, in this case, because the operator's gaze is not directed to the effective area set for the start button 32 when the start button 32 is operated, the operation for the start button 32 is invalidated.

In detail, when the operation for an optional operation button is received from the operator by the operation panel 20, the gaze detection unit 28 detects the position of the operator's gaze and the CPU 11 of the image processing apparatus 110 specifies the portion which is viewed by the operator. Further, the CPU 11 refers the management table 117 and obtains the effective area which is set for the operated operation button. In this example, the effective area which is set for the start button 32 is the effective area 61 shown in FIG. 6. The CPU 11 judges whether the position of the operator's gaze is within the effective area 61. In case that the position of the operator's gaze is within the effective area 61, the current operation for the start button 32 is validated. In case that the position of the operator's gaze is not within the effective area 61, the current operation for the start button 32 is invalidated.

In case that the operation is controlled as described above, because the operator is required to view the start button 32 when the Scan To Email transmission is executed, a wrong operation is avoided.

Specific Example 2: In Case that the Number is Input by Using the Numerical Keypad In case that the number, such as the number of copies, the telephone number, is input by using the numerical keypad 31 or the like, it is not necessarily required to direct the operator's gaze to the numerical keypad 31. For example, some of the users operate the numerical keypad 31 without viewing the numerical keypad 31 while the operators view the display unit 22. In case of such an operation button for simply inputting the contents, it is not necessary to especially designate the effective area (the area type may be set to the "any portion").

Further, as shown in the example of FIG. 19, the effective area 63 corresponding to the display unit 22 and the effective area 62 including the numerical keypad 31 are set as the effective area for the numerical keypad 31 to narrow the effective area. In case that the effective area is narrowed as described above, because the user is required to view the display unit 22 or the numerical keypad 31 when the number is input by using the numerical keypad 31, an error input can be prevented.

As described above, when the operation for one operation button is received, in case that the operator's gaze is not directed to the effective area which is set for the operated operation button, the above operation is invalidated. Only in case that the operator's gaze is directed to the effective area, the above operation is validated. Therefore, in case that each effective area having the size which is different according to the importance of each operation button is set, the avoidance of the wrong operation and the convenience in the operation (the convenience of operating the operation button while the operator views another portion) are realized in balance according to the function of each operation button.

Next, in the second embodiment, the case in which the effective area for one operation button is changed according to the window displayed on the display unit 22, is explained.

Figure 26:
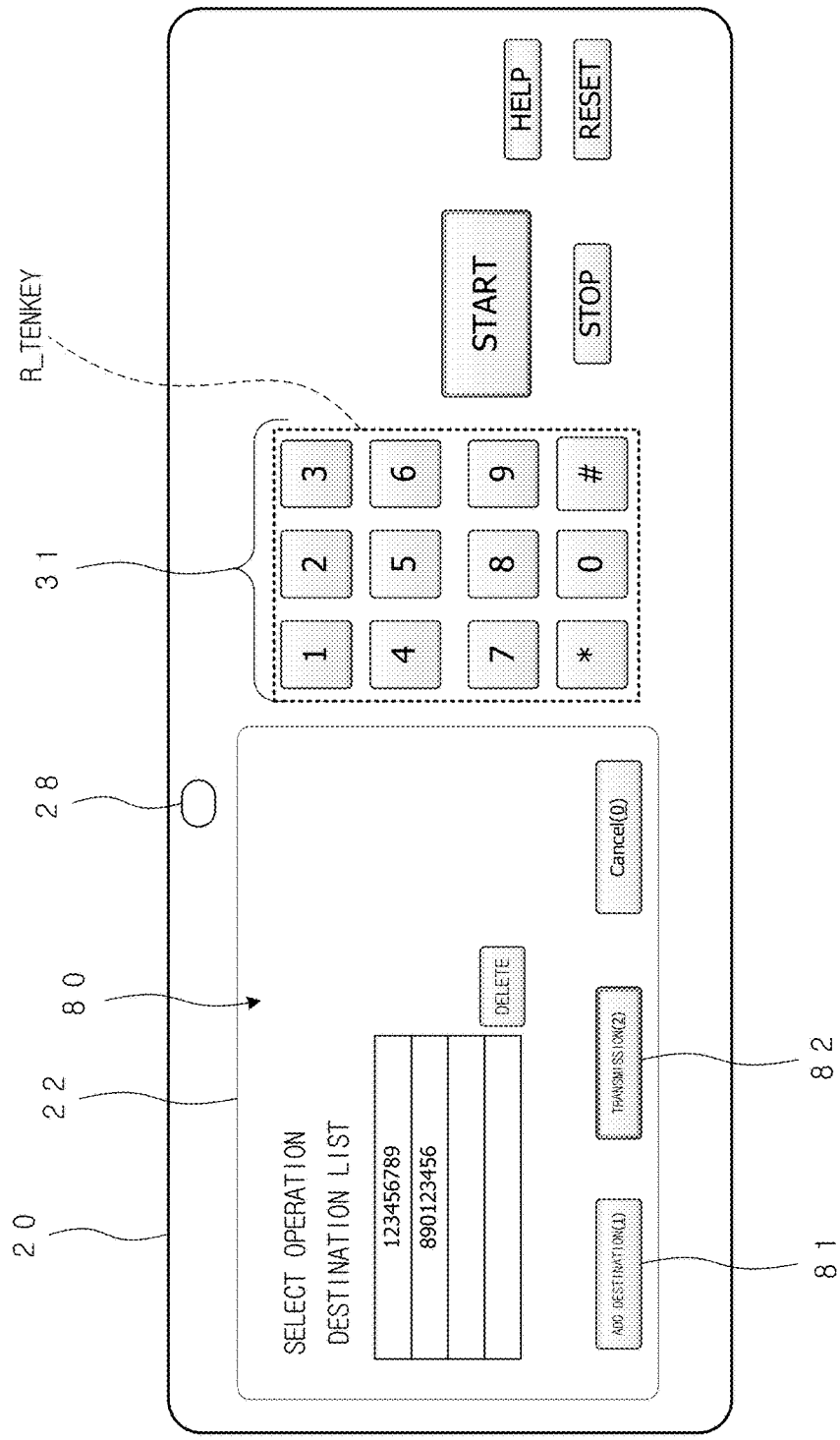
FIG. 26 is a view showing the operation panel according to the second embodiment in the situation in which the destination operation window is displayed on the display unit.

FIG. 26 shows the operation panel 20 in the situation in which the destination operation window 80 is displayed on the display unit 22. In the destination operation window 80, the operation for executing the transmission to the destination which is currently entered, and the operation for adding a new destination to the destination list, are received. The numerical keypad 31 is normally used in order to input the number. However, in the destination operation window 80 shown in FIG. 26, the numerical keypad 31 is used as shortcut keys.

Specifically, the key (1) has the same function as the destination addition button 81. The key (2) has the same function as the transmission execution button 82. Therefore, in the situation in which the destination operation window 80 is displayed on the display unit 22, for example, the image processing apparatus 10 sets the area of "R_TENKEY" as the effective area for each key of the numerical keypad 31 in order to avoid the wrong operation.

In the situation in which the destination operation window 80 is displayed on the display unit 22, the area of "R_TENKEY" is set as the effective area for each key of the numerical keypad 31. In case that the operator's gaze is directed to the area of "R_TENKEY" including the key (1) when the key (1) is pressed, the image processing apparatus 110 validates the operation for the key (1). Then, the image processing apparatus 10 changes the window displayed on the display unit 22 to the destination entry window 85 shown in FIG. 10 like the case in which the destination addition button 81 is operated.

On the other hand, in case that the operator's gaze is not directed to the area of "R_TENKEY" when the key (1) is pressed in the situation in which the window operation window 80 is displayed on the display unit 22, the image processing apparatus 110 invalidates the operation for the key (1).

Further, in case that the operator's gaze is directed to the area of "R_TENKEY" when the key (2) is pressed in the situation in which the window operation window 80 is displayed on the display unit 22, the image processing apparatus 110 validates the operation for the key (2), and executes the transmission process like the case in which the transmission execution button 82 is operated.

On the other hand, in case that the operator's gaze is not directed to the area of "R_TENKEY" when the key (2) is pressed in the situation in which the window operation window 80 is displayed on the display unit 22, the image processing apparatus 110 invalidates the operation for the key (2), and does not execute the transmission process.

As explained in the first embodiment, in the destination entry window 85 shown in FIG. 10, the numerical keypad 31 is used in order to input the number. The situation caused by the wrong operation for the operation button for simply inputting the number can be repaired. Therefore, in the second embodiment, in the situation in which the destination entry window 85 is displayed on the display unit 22, the area type of the effective area for the numerical keypad 31 is set to, for example, "any portion" in which the operation is not invalidated even though the operator views any portion.

When the key (1) which is a hardware key is pressed in the situation in which the destination entry window 85 is displayed on the display unit, the operator views the destination entry window 85 (display unit 22). Therefore, even though the operator's gaze is not directed to the key (1), the image processing apparatus 110 validates the operation for the key (1). Specifically, the input of the number "1" is accepted, and the number "1" is additionally displayed in the destination box 87.

FIG. 27 shows an example of the management table 117 which is used in case that the effective area for each operation button is changed for each window. In the management table 117 shown in FIG. 27, the effective areas which are applied when the destination operation window 80 is displayed and the effective areas which are applied when the destination entry window 85 is displayed are registered for each operation button. In this example, in case that the destination operation window 80 is displayed, each effective area for the key (1), the key (2) and the key (3) is set to "R_TENKEY". In case that the destination entry window 85 is displayed, each effective area for the above keys is set to "R_ANY" (the area type thereof is set to any portion).

The CPU 11 has a function as the setting changing unit for automatically changing the setting of each operation button. Specifically, when an optional operation button is operated, the CPU 11 specifies the window which is currently displayed on the display unit 22 and obtains the validity/invalidity information corresponding to the specified window from the management table 117 to recognize the effective area for the operated operation button in the window which is currently displayed. Then, the CPU 11 judges the validity/invalidity of the current operation according to whether the operator's gaze is directed to the recognized effective area.

The effective area "R_TENKEY" is an area including all of the keys 1 to 9, * and # (referred to as the key group). In the management table 117 shown in FIG. 27, a common effective area (R_TENKEY) including a plurality of operation buttons, such as the key (1), the key (2), the key (3), . . . , is set for these operation buttons. That is, the operation for one key is validated in case that the operator views any portion of the key group even though the operator does not view the key to be operated. In this case, when the validity/invalidity of the operation is judged, the severity of the position of the operator's gaze is set to a lower level.

Next, the case in which the effective area for one operation button is changed according to the function mode (type of the job), is explained.

Like the first embodiment, the image processing apparatus 110 has a plurality of function modes corresponding to the types of jobs which are input and set.

Figure 28:
FIG. 28 is a view showing an example of the management table (for each operation button and for each function mode) according to the second embodiment.

FIG. 28 shows an example of the management table 117 in which the effective area for one operation button is registered for each function mode. In FIG. 28, the setting which is applied to the start button 32 in the copy mode, the setting which is applied to the start button 32 in the scan mode, the setting which is applied to the start button 32 in the facsimile mode and the setting which is applied to the start button 32 in the BOX mode are registered.

The CPU 11 refers the validity/invalidity information registered in the management table 17, which corresponds to the selected function mode. Therefore, the effective area for the operated operation button is automatically changed according to the selected function mode.

In the example of FIG. 28, the effective area for the start button 32 is automatically changed so as to set the area type to R_ANY (any portion) in the copy mode and the BOX mode and so as to set the area type to R_START in the scan mode and the facsimile mode.

In the copy mode, even though the start button 32 is wrongly operated, only an original is wrongly printed. In the BOX mode, only the file of the image obtained by reading an original is stored. That is, it is thought that a wrong operation for the start button 32 in these modes is a slight error which can be repaired to a certain degree. Therefore, in the copy mode and the BOX mode, the area type of the effective area for the start button 32 is set to "R_ANY" (any portion).

On the other hand, in the scan mode and the facsimile mode, because the transmission process is executed, for example, a wrong operation in which the start button 32 is operated in the situation in which a correct destination is not set is a significant error which causes the irreparable situation. Therefore, in these function modes, by setting the area type of the effective area for the start button 32 to "R_START" (the area in which the start button 32 is provided), the operation for the start button 32 is invalidated when the start button 32 is operated without viewing the start button 32.

The effective area which is set for one operation button in each function mode may be suitably set according to the function of the operation button to be operated in each function mode and the importance of the problem caused by a wrong operation for the operation button. In FIG. 28, only the start button 32 is shown. However, in case that each effective area for a plurality of operation buttons is changed for each function mode, the effective area for each operation button is registered for each function mode. That is, the management table 117 is prepared for each operation button and for each function mode.

Figure 29:
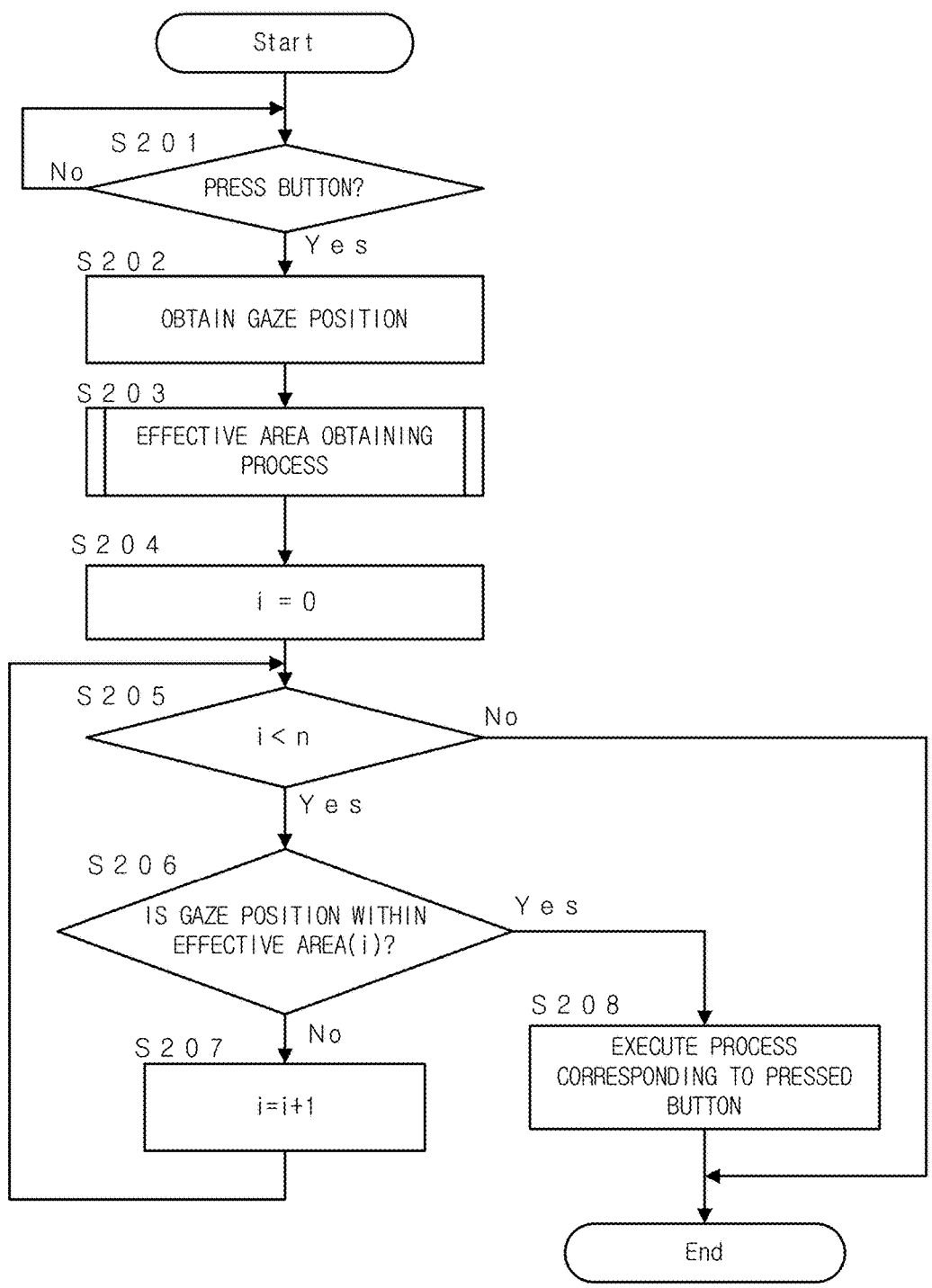
FIG. 29 is a flowchart showing the process which is carried out by the image processing apparatus for receiving the operation for the operation button, according to the second embodiment.

FIG. 29 shows the flowchart of the process which is carried out by the image processing apparatus 110 for receiving the operation for the operation button. When any one of the operation buttons provided on the operation panel 20 is pressed (Step S201; Yes), the CPU 11 of the image processing apparatus 110 obtains the position of the operator's gaze which is detected by the gaze detection unit 28 (Step S202). Next, the CPU 11 refers the management table 117 and obtains the effective area for the operation button which is currently operated (Step S203).

In case that a plurality of effective areas are set for one operation button, the number of effective areas obtained in Step S203 is set to n.

The CPU 11 judges whether the position of the operator's gaze, which is obtained in Step S202 is within any one of the effective areas obtained in Step S203 (Step S204 to Step S207). In case that the position of the operator's gaze is within any one of the effective areas (Step S206; Yes), the CPU 11 judges that the current operation is valid and executes the corresponding process (Step S208). Then, the process is ended (End).

In case that the position of the operator's gaze, which is obtained in Step S202 is out of all of the effective areas obtained in Step S203 (Step S206; No and Step S205; No), the CPU 11 judges that the current operation is invalid. Then, the process is ended (End).

Figure 30:
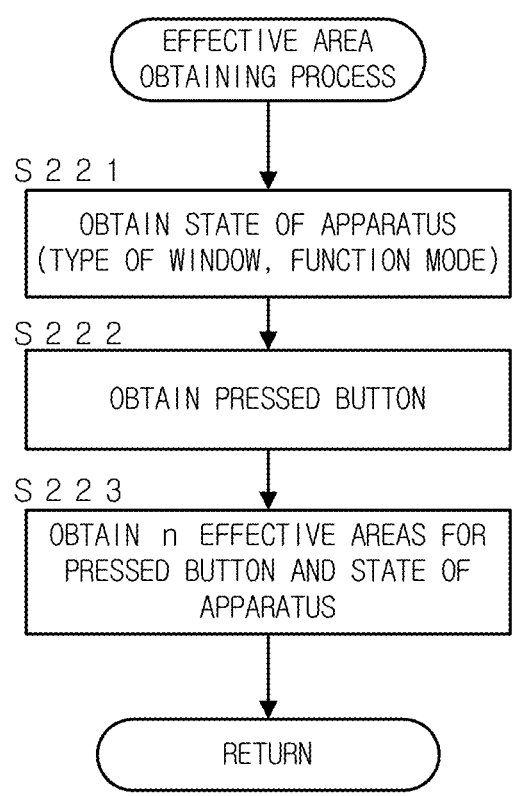
FIG. 30 is a flowchart showing the detail of the effective area obtaining process (Step S203 in FIG. 29)

FIG. 30 shows the detail of the effective area obtaining process (Step S203 in FIG. 29). Firstly, the CPU 11 obtains the information indicating the state of the apparatus (Step S221). In this embodiment, as the information indicating the state of the apparatus, the CPU 11 obtains the current function mode and the identification information of the window which is currently displayed on the display unit 22 (window ID or the like).

Next, the CPU 11 specifies the operation button which is currently operated (Step S222). The CPU 11 obtains the effective area which is set for the combination of the specified operation button and the state of the apparatus, which is obtained in Step S221, from the management table 117 (Step S223). Then, the process is ended (Return).

The operation display device 140 also carries out the process which is the same as the above process.

As disclosed in Japanese Patent Application Publication No. 2012-142878 and Japanese Patent Application Publication No. 2007-45169, in the technology for judging the validity of the key operation according to whether a user gazes at the display window, the device does not discriminate the operation button in which the bad situation can be repaired even though the wrong operation is carried out, from the operation button in which the bad situation cannot be repaired in case that the wrong operation is carried out. Therefore, even in case that the operation button in which the bad situation can be repaired even though the wrong operation is carried out, is pressed, a user has to operate the above operation button while the user views the display window. It is inconvenient for the user who is accustomed to operating a device because the user cannot slightly look away.

Therefore, it is preferable to take the measure for the wrong operation by classifying the operation buttons into two types of operation buttons which are the operation button in which the bad situation can be repaired even though the wrong operation is carried out and the operation button in which the bad situation cannot be repaired in case that the wrong operation is carried out. Further, because the importance of each operation button is varied, in case that the importance of the operation button is classified into two or more levels, it is desirable to finely take the measure to avoid the wrong operation according to the importance of each operation button.

For example, it is assumed that the operation for one operation button is carried out while a user views only the outline (frame) of the operation button. In this case, the user recognizes the outline of the operation button. However, because the user does not view the indication (name of the operation button or the like) indicated in the center of the operation button, the user sometimes does not precisely recognize the function of the operation button.

In case of the operation button having high importance, it is desirable that an operator views the indication or the like, which is indicated in the operation button and recognizes the function of the operation button. On the other hand, in case that the above measure to avoid the wrong operation is finely taken for the operation button having the intermediate importance or the operation button in which the bad situation can be repaired even though the wrong operation is carried out, the convenience in the operation is deteriorated. In the image processing apparatus 110 and the operation display device 140 according to the second embodiment, because the effective area can be set for each operation area, for example, it is possible to set the effective area for the operation button in which the wrong operation is a significant error which causes the irreparable situation, so as to invalidate the operation for the operation button when the operator does not view the operation button. On the other hand, it is possible to set the effective area for the operation button in which the bad situation can be repaired even though the wrong operation is carried out, so as to validate the operation for the operation button without viewing the operation button. Thereby, it is possible to avoid the wrong operation which causes the irreparable situation, and to secure the convenience in the normal operation (the convenience of operating the operation button while the operator views another portion). Further, it is possible to take the measurement to avoid the wrong operation by detecting the operator's gaze according to the importance of each operation button.

Further, because the size, the position, the number and the like of the effective area can be optionally set, the effective area can be set for each operation button.

Further, because the effective area for each operation button is automatically changed according to the selected function mode, the effective area can be suitably set even though the function of the operation button is changed according to the state of the apparatus.

As described above, the second embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

In the second embodiment, the image processing apparatus 110 is a multi-function peripheral. However, as long as the apparatus comprises an image processing unit and an operating device for receiving the operation for setting and inputting a job to be executed by the image processing unit, the present invention can be applied to another type of apparatus, such as a copy machine, a printer or the like.

The method for setting the effective area, which is explained in the embodiment, is an exemplification, and the present invention is not limited to the above method. For example, the effective area may be set in an optional shape except the rectangle. Alternatively, the effective area may be set by selecting one from the following options: (1) the area in which the operation button is provided, (2) the area in which the operation button is provided and the periphery of the operation button, (3) only the center portion of the operation button (the portion in which the information indicating the name or the function of the operation button is described), (4) the whole operation panel, and the like.

In case of the operation button for receiving one instruction among the operation for starting the process, the operation for confirming the input contents, the operation for stopping the process, it is preferable to set the effective area to only the whole area in which the operation button is provided or a portion of the whole area (for example, the text portion, the number portion or the mark portion of the operation button). On the other hand, in case of the operation button for receiving the instruction except the operation for starting the process, the operation for confirming the input contents and the operation for stopping the process, it is desirable to set the effective area to the area which is wider than the area in which the operation button is provided (for example, the area including the operation button and the periphery of the operation button or the whole area of the operation panel) or set the area type to the any portion.

Further, the operation button in which it is judged whether the operator's gaze is within the effective area is not limited to hardware keys, and may be adopted to the operation button (software keys) displayed on the display unit 22 or the like, or an optional operation button for receiving the operation from the operator.

In the second embodiment, in case that the operator's gaze is within the effective area, the operation for the operation button is validated. However, in case that the operator's gaze is not within the effective area, the operation for the operation button may be invalidated. The condition for the validating the operation may include the condition except the gaze.

Figure 31:
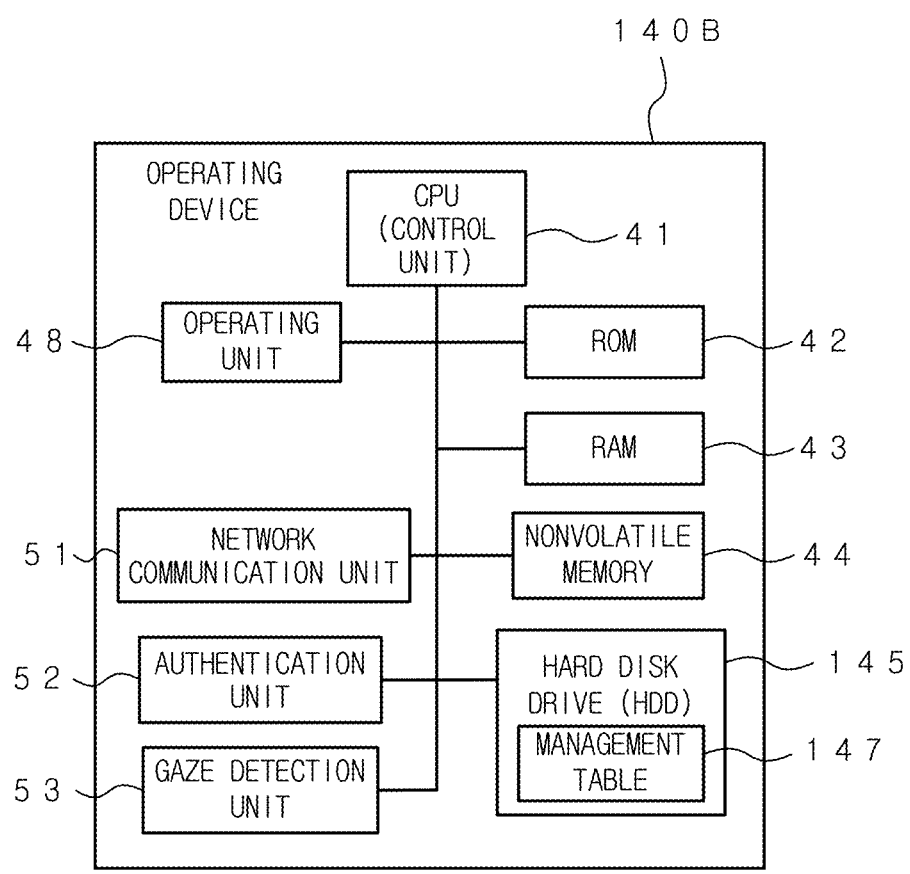
FIG. 31 is a block diagram showing the operating device in which the display unit is removed from the operation display device according to the second embodiment.

In the second embodiment, the operation display device 140 for remotely operating the image processing apparatus 110 is explained as the operating device. The operating device is not limited to the operation display device 140. As shown in FIG. 31, the operating device is configured as an operating device 140B in which the display unit 49 is removed from the operation display device 140 shown in FIG. 16.

The effective area for judging the gaze directed to each key may be set to the area in which the key group (input keys for inputting the numbers "1" to "9" and the marks "*" and "#") is provided. The effective area for judging the gaze directed to each key may be set to the area in which each key is provided. For example, the effective area for the key (1) may be set to only the area in which the key (1) is provided.

In the second embodiment, a user can optionally change the contents registered in the management table 117. The image processing apparatus or the operating device in which a user cannot change the contents which are previously registered, may be configured.

Further, in the second embodiment, the validity/invalidity of the operation is judged in accordance with the position of the operator's gaze which is directed when the operation button is pressed. Like the first embodiment, the position of the operator's gaze which is directed immediately before the operation button is pressed may be considered.

The present U.S. patent application claims the priority of Japanese Patent Applications No. 2013-158315 and No. 2013-158316, filed on Jul. 30, 2013, according to the Paris Convention, and the entirety of which is incorporated herein by reference for correction of incorrect translation.

What is claimed is:

1. An operating device, comprising:
an operation receiver comprising a plurality of operation buttons;
a gaze detector configured to detect a gaze of an operator who conducts a touch operation for the operation receiver; and
a processor configured to:
judge whether or not a touch operation for a predetermined operation button of the operation receiver is performed,
judge whether or not the gaze of the operator is within a predetermined area in a predetermined operation button of the operation receiver,
according to a first judgment that the gaze of the operator is within the predetermined area in the predetermined operation button when the touch operation for the predetermined operation button is performed, judge the touch operation for the predetermined operation button is valid, and
according to a second judgment that the gaze of the operator is out of the predetermined area in the predetermined operation button when the touch operation for the predetermined operation button is performed, judge the touch operation for the predetermined operation button is invalid.

2. The operating device of claim 1, wherein a plurality of operation buttons include a first type of operation button and a second type of operation button, and
wherein in case that the predetermined operation button for which the touch operation is performed is the first type of operation button, the processor judges that the touch operation is invalid in case that the gaze of the operator is out of the predetermined area in the predetermined operation button when the touch operation for the predetermined operation button is performed, and wherein in case that the predetermined operation button for which the touch operation is performed is the second type of operation button, the processor does not include a judgment as to whether or not the gaze of the operator is within the predetermined area in the predetermined operation button when the touch operation for the predetermined operation button is performed, in a condition for judging whether the touch operation for the predetermined operation button is valid or invalid.

3. The operating device of claim 2, wherein the first type of operation button is an operation button for receiving any one instruction among an operation for starting a process, an operation for confirming input contents, an operation for stopping the process and an operation for resetting an input value, and
the second type of operation button is an operation button for receiving an instruction except the operation for starting the process, the operation for confirming the input contents, the operation for stopping the process and the operation for resetting the input value.

4. The operating device of claim 2, further comprising a setting changing device configured to change a setting of each operation button of the operation receiver so as to set each operation button to the first type of operation button or the second type of operation button.

5. The operating device of claim 4, wherein the operating device has a function of receiving a plurality of types of jobs by receiving a touch operation for setting and inputting any one of the plurality of types of jobs, and
wherein the setting changing device changes the setting of each operation button so as to set each operation button to the first type of operation button or the second type of operation button according to the type of job which is received by the operation receiver.

6. The operating device of claim 4, further comprising a display configured to display any one of a plurality of types of windows,
wherein the setting changing device changes the setting of each operation button so as to set each operation button to the first type of operation button or the second type of operation button according to the window displayed on the display.

7. The operating device of claim 2, wherein in case that the gaze of the operator is within an area in which the predetermined operation button which is operated is provided or within a center portion of the predetermined operation button which is operated, it is judged that the gaze of the operator is within the predetermined area in the predetermined operation button.

8. The operating device of claim 1, further comprising an effective area storage configured to store an effective area for judging the gaze of the operator, as the predetermined area in the predetermined operation button, for each operation button,
wherein in case that the gaze of the operator is out of the effective area for one operation button of the operation receiver when the touch operation for the one operation button is performed, the processor judges that the touch operation for the one operation button is invalid.

9. The operating device of claim 8, wherein the plurality of operation buttons include a first operation button and a second operation button,
wherein a ratio of a size of the first operation button to a size of the effective area set for the first operation button is different from a ratio of a size of the second operation button to a size of the effective area set for the second operation button.

10. The operating device of claim 8, wherein the effective area can be changed for each operation button.

11. The operating device of claim 8, wherein the operating, device has a function of receiving a plurality of types of jobs by receiving a touch operation for setting and inputting any one of the plurality of types of jobs, the effective area is set for each operation button and for each type of jobs, and when a touch operation for setting and inputting of one type of job is performed by using the one operation button, the processor judges whether the touch operation for the one operation button is valid or invalid in accordance with the effective area set for a combination of the one operation button and the one type of job.

12. The operating device of claim 8, further comprising a display configured to display any one of a plurality of types of windows, wherein the effective area is set for each operation button and for each window, and when a touch operation for the one operation button is performed, the processor judges whether the touch operation for the one operation button is valid or invalid in accordance with the effective area set for a combination of the one operation button and the window displayed on the display.

13. The operating device of claim 8, wherein the plurality of operation buttons include a first operation button and a second operation button, wherein a whole area in which the first operation button is provided or only a part of the whole area is set as the effective area for the first operation button, and the effective area for the second operation button includes the second operation button and is set so as to be wider than an area in which the second operation button is provided.

14. The operating device of claim 8, wherein a common effective area including an area in which two or more operation buttons of the operation receiver are provided is set for the two or more operation buttons.

15. The operating device of claim 8, wherein a plurality of the effective areas can be set for the one operation button.

16. An image processing apparatus, comprising:
an image processing unit; and
the operating device of claim 1, for receiving a touch operation for inputting a job to be executed by the image processing unit.

17. The operating device according to claim 1, wherein the processor is further configured to:
judge the touch operation for the predetermined operation button is valid, in response to a judgment that the gaze of the operator is within the predetermined area in the predetermined operation button when the touch operation for the predetermined operation button is performed, and judge the touch operation for the predetermined operation button is invalid, in response to a judgment that the gaze of the operator is out of the predetermined area in the predetermined operation button when the touch operation for the predetermined operation button is performed.

18. The operating device of claim 1, further comprising an effective area storage configured to store an effective area for judging the gaze of the operator, as the predetermined area in the predetermined operation button, for each operation button, wherein the operating device is configured to receive a job by receiving a touch operation for setting and inputting any one of the plurality of types of jobs, the effective area for the predetermined operation button is changed according to a type of the job, and the processor judges whether the touch operation for the predetermined operation button is valid or invalid in accordance with the effective area to be changed by the type of the job.

19. A non-transitory computer-readable recording medium storing an application program for an operating device, the operating device comprising:
an operation receiver comprising a plurality of operation buttons;
a gaze detector configured to detect a gaze of an operator who conducts a touch operation for the operation receiver; and
a processor, the application program making the processor to execute:
judging whether or not a touch operation for a predetermined operation button of the operation receiver is performed, judging whether or not the gaze of the operator is within a predetermined area in a predetermined operation button of the operation receiver, according to a first judgment that the gaze of the operator is within the predetermined area in the predetermined operation button and the touch operation for the predetermined operation button is performed, judging the touch operation for the predetermined operation button is valid, and according to a second judgment that the gaze of the operator is out of the predetermined area in the predetermined operation button and the touch operation for the predetermined operation button is performed, judging the touch operation for the predetermined operation button is invalid.

* * * * *